United States Patent Office 3,558,629
Patented Jan. 26, 1971

3,558,629
2-HALO-4-(1-PIPERAZINYL)-BENZALDEHYDES AND RELATED COMPOUNDS
Sydney Archer, Bethlehem, and David Rosi, East Greenbush, N.Y., assignors to Sterling Drug, Inc., New York, N.Y., a corporation of Delaware
No Drawing. Continuation-in-part of application Ser. No. 444,848, Apr. 1, 1965, now Patent No. 3,379,620. This application Aug. 31, 1967, Ser. No. 664,628
Int. Cl. C07d 51/70
U.S. Cl. 260—268                            2 Claims

ABSTRACT OF THE DISCLOSURE

4 - [amino-(polycarbon-lower-alkyl)-amino] - 2-halobenzyl alcohols and lower-alkyl ethers thereof have schistosomacidal activity. The benzyl alcohols are prepared: by reduction of the corresponding benzaldehydes or lower-alkyl benzoates; by microbiological oxidation of the corresponding 4-substituted-amino-2-halotoluenes; or, for the compounds where polycarbon-lower-alkyl is ethylene, by reducing the corresponding lower-alkyl 4 - (aminoacetylamino)-2-halobenzoates or by reducing the corresponding 4 - (aminoacetylamino)-2-halobenzyl alcohols. The ethers are prepared by heating the benzyl alcohols with a lower-alkanol in the presence of an acid. Novel intermediate 2-halo-4-(1-piperazinyl)-benzaldehydes are prepared by formylation of 3 - (1-piperazinyl)-halobenzenes with an N,N-disubstituted-formamide, e.g., dimethylformamide, in the presence of a phosphorus oxyhalide.

This application is a continuation-in-part of our copending application Ser. No 444,848, filed Apr. 1, 1965, now U.S. Pat. 3,379,620, Apr. 23, 1968.
This invention relates to 4-aminobenzyl alcohol derivatives and to processes for their preparation.
The invention sought to be patented, in its composition aspect, resides in the class of compounds which we designate 4-[amino-(polycarbon-lower-alkyl)-amino]-2-halobenzyl alcohols and lower-alkyl ethers thereof. The tangible embodiments of this composition aspect of the invention possess the inherent applied use characteristics of having schistosomacidal properties, as determined by standard chemotherapeutic evaluation procedures. Said U.S. Pat. 3,379,620, discloses and claims the process for producing a 4-[amino-(polycarbon-lower-alkyl)-amino]-2-halobenzyl alcohol which comprises subjecting a 4-[amino-(polycarbon-lower-alkyl)-amino] - 2-halotoluene to the fermentative enzymatic action of an organism capable of effecting oxidation of the 1-methyl group to 1-hydroxymethyl, said organism classified in the orders Moniliales, Mucorales, Sphaeriaeles, Sphaeropsidales, Melanconiales and Actinomycetales. We have found variations exist in the efficiency of different genera and species of organisms within the above orders in our oxidative process and have therefore ascertained that, by following the screening procedure hereinafter described, the effectiveness of any particular organism can readily be determined.
The invention sought to be patented, in another process aspect, resides in the process of preparing a 4-[amino-(polycarbon-lower-alkyl)-amino] - 2-halobenzyl alcohol which comprises reacting a 4-[amino-(polycarbon-lower-alkyl)-amino] - 2 - halobenzaldehyde or lower-alkyl 4-[amino-(polycarbon-lower-alkyl)-amino]-2-halobenzoate with a reducing agent effective to reduce, respectively, benzaldehydes or lower-alkyl benzoates to benzyl alcohols.
Another process aspect of the invention, sought to be patented, resides in the process of preparing an intermediate 4-(1-piperazinyl)-2-halobenzaldehyde which comprises reacting a 3-(1-piperazinyl)-halobenzene with an N—R'—N—R"-formamide, where R' is lower-alkyl and R" is lower-alkyl or phenyl, in the presence of phosphorus oxyhalide.

Well known as schistosomacidal agents are a wide variety of 4-[amino-(polycarbon-lower-alkyl)-amino]-2-halotoluenes which differ from our 4[-amino-(polycarbon-lower-alkyl)-amino]-2-halobenzyl alcohols or ethers in having methyl instead of hydroxymethyl or alkoxymethyl as a substituent on the benzene ring ortho to halo and para to the aminoalkylamino substituent. The "amino-(polycarbon-lower-alkyl)-amino" substituent of these known 4-[amino-(polycarbon-lower-alkyl)-amino-2-halotoluenes varies widely; for example, in some compounds the two amino groups are connected by alkylene having a chain of two to six carbon atoms inclusive, optionally substituted by lower-alkyl, and having its connecting linkages on different carbon atoms, with the terminal amino being primary, secondary or tertiary, and the other amino (directly connected to the benzene ring) bearing hydrogen or lower-alkyl; in other compounds the two amino groups are part of a piperazino ring, with the terminal amino (i.e., the 4-ring nitrogen of piperazino) being unsubstituted or bearing various substituents, e.g., lower-alkyl, lower-alkenyl, lower-hydroxyalkyl, phenyl-(lower-alkyl), carbamyl, thiocarbamyl, lower-carbalkoxy, carboxy-(lower-alkanoyl), carboxy-(lower-alkenoyl), etc. Also, these compounds can bear other low-molecular substituents, e.g., lower-alkyl, at one or more of the remaining three available ring positions, i.e., 3, 5 and/or 6. One of the best known and most active of these 4-(aminoalkylamino)-2-halotoluenes is 2 - chloro - 4-(2-diethylaminoethylamino) toluene, preferably named as 3-chloro-N-(2-diethylaminoethyl)-4-methylaniline and perhaps better known as "Mirasan"; other highly active and preferred members of this known class of compounds are 1-(3-chloro-4-methylphenyl)piperazine [same as 2-chloro-4-(1-piperazinyl)toluene], 1 - (3-chloro-4-methylphenyl)-4-methylpiperazine, maleic acid mono-4-(3-chloro-4-methylphenyl) piperazide and 2-chloro-4-{4-[6-(4-tertiary-amylphenoxy) hexyl]-1-piperazinyl}-toluene. All of these and other heretofore known compounds having high schistosomacidal activity required the presence of the methyl substituent on the benzene ring, as well as the halo and amino-(polycarbon-lower-alkyl)-amino substituents at ortho and para positions, respectively. Workers in the field have reported that the methyl group cannot be replaced by another radical without losing the schistosomacidal activity.
We have now found that compounds of this type where the ring methyl substituent is replaced by hydroxymethyl, i.e., 4-[amino-(polycarbon-lower-alkyl)-amino]-2-halobenzyl alcohols, or by lower-alkoxymethyl not only have high schistosomacidal activity but also are more active as schistosomacidal agents in hamsters and less toxic than the corresponding methyl compounds.
Without limiting the generality of the foregoing, illustrative and preferred embodiments of our 4-[amino-(polycarbon - lower - alkyl) - amino] - 2 - halobenzyl alcohols and lower-alkyl ethers are those of Formula I

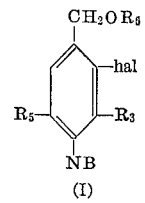

(I)

where hal is halo, i.e., chloro, bromo, iodo or fluoro;

$R_3$, $R_5$ and $R_6$ are each hydrogen or lower-alkyl; NB is $N(R)$—Y—$NR_1R_2$ or

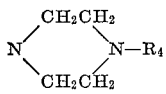

R is hydrogen or lower-alkyl; Y is polycarbon-lower-alkylene; $R_1$ and $R_2$ are each hydrogen or lower-alkyl, lower-alkenyl or lower-hydroxy-alkyl and can be the same or different; $R_1$ and $R_2$ taken with N also comprehend saturated N-heteromonocyclic radicals having from five to six ring atoms, illustrated by piperidino, pyrrolidino, morpholino, piperazino, hexamethyleneimino and lower-alkylated derivatives thereof; and, $R_4$ is hydrogen, lower-alkyl, lower-alkenyl, lower-hydroxyalkyl, carbamyl, thiocarbamyl, lower-alkanoyl, lower-carbalkoxy, carboxy(lower-alkanoyl), carboxy-(lower-alkenoyl) or phenyl-X-(lower-alkyl), where X is oxygen or a direct linkage. Here and elsewhere throughout this specification, it will be understood the benzene ring of phenyl can bear any number and kind of substitutes such as would occur to the man skilled in organic chemistry, e.g., such substituents, solely for illustration and without limitation, including lower-alkyl, lower-alkoxy, halo (chloro, bromo, iodo or fluoro), nitro, lower-alkyl-mercapto, lower-alkanoylamino, lower-alkanoyloxy, lower-alkylamino, lower-alkenyl, and the like.

The above terms, as used throughout this specification, have the following meanings, each of which are illustrated but without limiting their generality: "lower-alkyl" means alkyl radicals having from one to six carbon atoms which can be arranged as straight or branched chains, e.g., methyl, ethyl, n-propyl, isopropyl, n-butyl, 2-butyl, isobutyl and n-hexyl; "polycarbon-lower-alkylene" means alkylene radicals having from two to six carbon atoms inclusive and having its connecting linkages on different carbon atoms, e.g.,

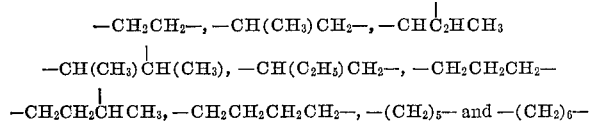

"lower-alkenyl" means alkenyl radicals having from three to six carbon atoms, e.g., 2-propenyl (allyl), 2-methyl-2-propenyl, 2-butenyl, 3-butenyl and 2-hexenyl; "lower-hydroxylalkyl" means hydroxyalkyl radicals having from two to six carbon atoms and having its connecting linkage and the hydroxyl group on different carbon atoms, e.g., 2-hydroxyethyl, 2-hydroxypropyl, 3-hydroxypropyl, 2 - hydroxy - 2 - methylpropyl, 4 - hydroxybutyl, 2 - hydroxy - 2,2 - dimethylpropyl and 6 - hydroxyhexyl; "lower-carbalkoxy" means carbalkoxy radicals where the alkoxy portion can be straight- or branch-chained and has from one to six carbon atoms, e.g., carbomethoxy, carbethoxy, carbo-n-propoxy, carbisopropoxy, carbo-n-butoxy and carbo-n-hexoxy; "lower-alkanoyl" means alkanoyl radicals having from one to six carbon atoms which can be arranged as straight or branched chains, e.g., formyl, acetyl, propionoyl (n-propanoyl), isobutyryl (2-methyl-n-propanoyl) and caproyl (n-hexanoyl); "lower-alkenyl" means alkenyl radicals having from three to six carbon atoms, e.g., 2-propenoyl, 2-methyl-2-propenoyl, 2-butenoyl, 3-butenoyl and 2-hexenoyl. When $NR_1R_2$ of Formula I or II (below) comprehends saturated (lower-alkylated)-N-heteromonocyclic radicals, lower-alkyl radicals can be attached to any available ring-atom and can vary preferably from one to three in number, e.g., 2 - methylpiperidino, 3 - ethylpiperidino, 4 - methylpiperidino, 2,6-dimethylpiperidino, 2,4 - dimethylpiperidino, 2,4,6 - trimethylpiperidino, 3 - n - propylpiperidino, 2,2-dimethylpiperidino, 2 - methylpyrrolidino, 2,5-dimethylpyrrolidino, 2,3 - dimethylmorpholino, 2 - ethylmorpholino, 2-methylhexamethyleneimino, 2,7 - dimethylhexamethyleneimino, 4 - methylpiperazino, 3 - ethylpiperazino, 2,4,6-trimethylpiperazino, and the like.

The 4 - [amino - (polycarbon-lower-alkyl)-amino]-2-halobenzyl alcohols and ethers of our invention are useful in the free base form or in the form of their acid-addition salts, and both forms are within the purview of the invention, and are considered to be one and the same invention. The acid-addition salts are simply a more convenient form for use; and, in practice, use of the salt form inherently amounts to use of the base form. The acids which can be used to prepare the acid-addition salts are preferably those which produce, when combined with the free base, chemotherapeutically acceptable salts, that is, salts whose anions are relatively innocuous to the animal organism in chemotherapeutic dose of the salts, so that the beneficial properties inherent in the free base are not vitiated by side effects ascribable to the anions; in other words, the latter do not substantially affect the chemotherapeutic properties inherent in the cations. In practicing our invention, we found it convenient to employ the hydrochloride or p-toluenesulfonate salt. However other appropriate chemotherapeutically acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, benzenesulfonic acid, quinic acid, 3-hydroxy-2-naphthoic acid, pamoic acid (2,2′-dihydroxy-1,1′-dinaphthylmethane-3,3′dicarboxylic acid), naponic acid (1,5 - naphthalenedisulfonic acid), and the like, giving the hydrobromide, hydroiodide, nitrate, phosphate, sulfamate, sulfate, acetate, citrate, tartrate, lactate, methanesulfonate, ethanesulfonate, benzenesulfonate, quinate, 3-hydroxy - 2 - naphthoate, pamoate and naponate, respectively.

The acid-addition salts are prepared preferably by reacting the free base and acid in an orgnic solvent, e.g., ethanol, acetone, etc., in which case the salt separates directly or can be obtained by concentration of the solution.

Although chemotherapeutically acceptable salts are preferred, all acid-addition salts are within the scope of our invention. All acid-addition salts are useful as sources of the free base form even if the particular salt per se is not desired as the final product, as for example when the salt is formed for purposes of purification or identification, or when it is used as an intermediate in preparing a chemotherapeutically acceptable salt by ion exchange procedures.

Also encompassed by our invention are simple esters of our 4 - [amino - (polycarbon - lower-alkyl)-amino]-2-halobenzyl alcohols, for example, lower-alkanoates (e.g., acetate, propionate and butyrate), phenylcarboxylates (e.g., benzoate, 3,5-dinitrobenzoate and 4-ethoxybenzoate) and carbanilates. These esters are prepared by known means and are useful to further characterize and identify our substituted-benzyl alcohols.

The molecular structures of the 4-[amino-(polycarbon-lower-alkyl)-amino]-2-halobenzyl alcohols of our invention were assigned on the basis of evidence provided by infrared, ultraviolet and nuclear magnetic resonance spectra, by chromatograph mobilities, and, by the correspondence of calculated and found values for the elementary analyses for representative examples.

The manner of making and using our invention will now be generally described so as to enable the person skilled in the art of microbiological or organic chemistry to make and use the same.

FERMENTATIVE ENZYMATIC OXIDATION

General screening procedure to determine efficacy of any specific organism: Inoculate the microorganism onto Sabouraud's agar slants or other agar base media suitable for growth. Place the inoculated slants in an incubator maintained at 25° C. and allow to grow for one week. Remove the slant and add 15 ml. of sterile distilled water to it. Loosen the spores and vegetative growth from the agar with a sterile needle. Transfer the suspension to a flask containing 100 ml. of a soy-dextrose medium, illustrated below, and place the flask in a rotary shaker in an incubator maintained at 25° C. at about 260 r.p.m. for twenty-four hours. After this initial time period (first stage seed), add 5 ml. of the submerged growth to each of duplicate flasks (250 ml.) containing the above-noted soy-dextrose medium, the composition of which is given below. Place the flasks in the shaker and allow to grow from about forty-eight to about seventy-two hours at 25° C. Add to one flask of each pair 5 mg. of any substrate 4-[amino-(polycarbon-lower-alkyl)-amino]-2-halotoluene dissolved in a minimum amount of a suitable solvent, e.g., water, water-ethanol or dimethylformamide, in 0.50 ml. of dimethylformamide. Add to the other flask an equal quantity of the solvent to serve as the control. Agitate all of the flasks under the same conditions for an additional twenty-four hours and remove from the shaker Note the growth characteristics and pH, then make the whole beer of each flask alkaline, e.g., with 0.5 ml. of 5.0 N sodium hydroxide solution, and extract with methylene dichloride or any other suitable solvent, e.g., chloroform, carbon tetrachloride, perchloroethylene, toluene, etc. Remove the solvent of each extract by warming in a water bath at about 60° C. Dissolve each residue in 2 ml. of methylene dichloride for application to silica gel plates containing 1% of a phosphor for thin-layer chromatographic analysis.

The screening samples are then all chromatographed on silica-gel thin-layer plates (TLC) using a suitable system, a preferred one consisting of nine volumes of ethyl acetate and one volume of triethylamine. The components are visualized as spots on a fluorescent background when viewed under ultraviolet light. The hydroxymethyl product, i.e., the 4-[amino-(polycarbon-lower-alkyl)-amino]-2-halobenzyl alcohol, appears as a spotless mobile (more polar) than the interemdiate toluene compound in said preferred chromatographic system. The silica gel containing the more polar spot is removed and is eluted with absolute methanol, and the eluate is subjected to ultraviolet spectral analysis.

Constitution of an illustrative nutrient medium suitable for the above screening procedure and for the batch fermentations given below in the examples is as follows:

Soy-dextrose

Soybean meal—5 g.
Dextrose—20 g.
NaCl—5 g.
$K_2HPO_4$—5 g.
Yeast—5 g.
Tap water—1 l.
pH to 6.4

Autoclave at 121° C. and 15 lbs. per sq. in. for 15 minutes.

The above-described general screening procedure and nutrient medium, as well as the batch fermentations given below in the specific examples, are illustrative and can be varied in different ways, e.g., by using other microorganisms whose fermentative enzymatic action is capable of effecting the oxidation of said 2,4-disubstituted-toluenes to the 2,4-disubstituted-benzyl alcohols; by using other nitrogen sources in place of those given above, e.g., corn meal, oat meal, other protein hydrolysates, meat extract, etc.; by using other carbon sources in place of dextrose, e.g., sucrose, glucose, maltose, starch, molasses, etc.; by varying the time of addition of the substrate after addition of the medium from 0 to about 96 hours; by varying the initial pH (for addition and conversion of substrate) from about 5.0 to about 7.5, preferably between 5.5 and 6.5; by varying the quantity of substrate; by varying the rate of stirring; and, by utilizing other modifications known in the fermentative art.

Large batch fermentation and procedures for isolating sufficient quantities of our 4-[amino-(polycarbon-lower-alkyl)-amino]-2-halobenzyl alcohols for elementary analyses and chemotherapeutic studies in the specific examples hereinbelow will further illustrate aspects of our invention.

FINAL PRODUCTS FROM CORRESPONDING BENZALDEHYDES OR LOWER-ALKYL BENZOATES

This aspect of the invention utilizes as intermediates 4-[amino-(polycarbon-lower - alkyl - amino] - 2 - halobenzaldehydes or lower-alkyl 4-[amino - (polycarbon-lower-alkyl)-amino] - 2 - halobenzoates, which are prepared by generally known procedures illustrated in the specific exemplary disclosure below or, in the case of the 4-aminoalkylamino - 2 - halobenzaldehydes, by another process aspect of our invention, hereinbelow described. The process comprises reacting the 4-aminoalkylamino-2-halobenzaldehyde or lower-alkyl 4-aminoalkylamino-2-halobenzoate with a reducing agent effective to reduce benzaldehydes or lower-alkyl benzoates, respectively, to benzyl alcohols. The reduction can be carried out both by catalytic hydrogenation and by chemical methods. Catalysts suitable when catalytic hydrogenation is used include Raney nickel, platinum or palladium. Suitable chemical reducing agents include: alkali aluminum hydrides, e.g., lithium aluminum hydride; alkali borohydrides, e.g., sodium borohydride; an alkali metal and a lower alkanol, e.g., sodium and ethanol. Also, the benzaldehydes can be reduced to the benzyl alcohols using iron and acetic acid or isopropyl alcohol and aluminum isopropoxide. In practicing our invention, we preferably used lithium aluminum hydride in ether or tetrahydrofuran in reducing the benzaldehydes and sodium borohydride in a lower alkanol, e.g., ethanol or methanol, with or without water, in reducing the lower-alkyl benzoates.

A modification of this aspect of the invention comprises reacting a lower-alkyl 4-aminoacetylamino-2-halobenzoate, e.g., without limiting the generality of the foregoing, a lower-alkyl 4-aminoacetylamino-2-halobenzoate of the Formula II

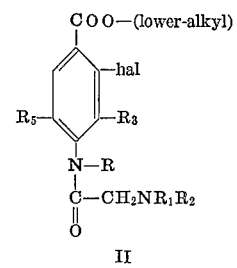

II where hal, R, $R_1$, $R_2$, $R_3$ and $R_5$ have the meanings given above for Formula I, with a reducing agent effective to reduce lower-alkyl benzoates to benzyl alcohols and aminoacetamides to aminoacetylamines. Suitable reducing agents are those given for the reduction of lower-alkyl benzoates to benzyl alcohols. In practicing our invention, we preferably used an alkali aluminum hydride, e.g., lithium aluminum hydride in an inert solvent, e.g., tetrahydrofuran, in the presence of a suitable catalyst, e.g. aluminum trichloride; best results were obtained using lithium aluminum hydride, tetrahydrofuran and aluminum chloride, and keeping the reaction temperature below 0° C., preferably between —15° C. and —5° C. Alternatively, the same reduction can be carried out but using instead of the benzoates of Formula II the corresponding benzyl alcohols, i.e., $CH_2OH$ in place of COO-(lower-alkyl). These intermediate 4-aminoacetylamino-2-halobenzyl alcohols, which also are useful as local anesthetic agents, as determined by standard pharmacological evaluation procedures, can be prepared from the corresponding 4-aminoacetylamino-2-halotoluenes by using our microbiological oxidative procedure described hereinabove. The intermediate 4-aminoacetylamino-2-halotoluenes are conveniently prepared in two generally known steps from the corresponding known 4-amino-2-halotoluenes, that is, by first reacting a 4-amino-2-halotoluene with chloroacetyl chloride to form a 4-(chloroacetylamino)-2-halotoluene which is then reacted with ammonia or appropriate amine of the formula $HNR_1R_2$ ($R_1$ and $R_2$ defined above) to yield the 4-($R_1R_2$N-acetylamino)-2-halotoluene.

FORMYLATION OF 3-(1-PIPERAZINYL)-HALOBENZENES

This aspect of our invention comprises reacting a 3-(1-piperazinyl)-halobenzene with an N—R'—N—R''-formamide, where R' is lower-alkyl and R'' is lower-alkyl or phenyl, in the presence of phosphorous oxyhalide to form the corresponding 4-(1-piperazinyl)-2-halobenzaldehydes. Because of ready availability and low cost, we preferably used dimethylformamide and phosphorous oxychloride. This reaction is run preferably with the 4-position of 1-piperazinyl containing a substituent inert under the reaction conditions, e.g., lower-alkyl, lower-alkanoyl, benzoyl, lower-alkenyl, carbamyl, thiocarbamyl, lower-carbalkoxy, phenyl-X-(lower-alkyl) where X is oxygen or a direct linkage.

Another aspect of the invention sought to be patented, resides in the class of compounds which we designate 2-halo-4-(1-piperazinyl)benzaldehydes. These compounds are useful intermediates in the preparation of compounds of our invention described hereinabove, e.g., those of Formula I where NB is

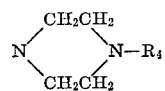

The lower-alkyl ethers of our benzyl alcohols, i.e., the compounds of Formula I where $R_6$ is lower-alkyl, are prepared by heating the benzyl alcohol (Formula I where $R_6$ is hydrogen) with the appropriate lower-alkanol in the presence of an acid, preferably a strong acid. This reaction is conveniently carried out heating the basic benzyl alcohol as its acid-addition salt, e.g., di(p-toluenesulfonate), in the lower alkanol at its boiling point to dissolve the benzyl alcohol salt and allowing the resulting solution to cool whereupon the basic lower-alkyl ether separates as its acid-addition salt.

The foregoing discussion is offered to illustrate the various aspects of our invention and not to limit its scope. Our invention is further illustrated by the following examples.

EXAMPLE 1

Fermentative enzymatic oxidation of 2-chloro-4-(1-piperazinyl)toluene to 2-chloro-4-(1-piperazinyl)-benzyl alcohol was accomplished as follows: Four 10 liter fermentations employing *Aspergillus sclerotiorum* (SWRI $A_{24}$, available at Sterling-Winthrop Research Institute, Rensselaer, N.Y.) in sterile soy-dextrose medium of the following composition were carried out.

Dextrose—1000 g.
Soybean meal—150 g.
Yeast—50 g.
NaCl—50 g.
$MgSO_4.nH_2O$—2.5 g.
$NaH_2PO_4.H_2O$—13.8 g.
$Na_2HPO_4.12H_2O$—301 g.
Tap Water—9.5 liters pH adjusted to 7.3 with 10 N HCl; autoclave at 120° C. and 15 p.s.i. for 15 minutes.

The stock culture was initially grown at 26° C. on slants in a nutrient medium (e.g., maltose, 40 g./liter, and Proteose Peptone No. 3, 10 g./liter) in 22 x 175 mm. tubes for ten to fourteen days. These slants were used to prepare seed for the 10-liter fermenters as follows: Sterile distilled water (10 ml.) was added to a slant and the spores and some vegetation growth were scrapped with a sterile hooked needle. The resulting suspension was added to a two liter flask containing 700 ml. of sterile soy-dextrose medium of the following composition:

Soybean meal—15 g.
Dextrose—20 g.
Yeast—5 g.
NaCl—5 g.
$K_2HPO_4$—5 g.
Tap water—1 liter pH adjusted to 6.4 with 10 N HCl prior to autoclaving at 121° C. and 15 p.s.i. for 15 minutes.

These cotton plugged flasks were incubated at 26° C. for approximately seventy hours on a rotary shaker with a one-inch throw at 240 r.p.m. Each flask provided seed for one 10-liter fermenter. The fermentations were carried out at 28° C. in a water bath with an air flow of 5 liters per minute and were agitated at 450 r.p.m. After an initial twenty-four hours' growth, the substrate, 2-chloro-4-(1-piperazinyl)toluene as its hydrochloride salt, 212 g. (53 g. to each fermenter), was added in portions (5–10 g.) over a period of five days. The tanks were assayed for 2-chloro-4-(1-piperazinyl)benzyl alcohol content periodically as follows: Samples from each fermenter were made basic with 0.2 ml. of 10 N sodium hydroxide solution and extracted with methylene dichloride. The extracts were evaporated to dryness and the residues dissolved in 3 ml. of methylene dichloride. Aliquots (20 µl.) were transferred to thin-layer silica gel plates impregnated with 1% of a phosphor (e.g., Radelin GS–115). The plates were developed in a solvent containing 8:1:1 parts by volume of $CH_2Cl_2:CH_3OH:N(C_2H_5)_3$. The components were viewed as blue spots on a yellow fluorescent background. Under these conditions, the $R_f$ value of the intermediate toluene derivative was 0.46 and that of the corresponding benzyl alcohol was 0.36.

Isolation: The fermentations were terminated by the addition of 130 ml. of 10 N NaOH and each tank was extracted with methylene dichloride (2×20 liters). The extracts were reduced under vacuum and combined. Further reduction in volume resulted in a yellow crystalline precipitate weighing 150 g. Thin layer chromatography of this material showed traces of 2-chloro-4-(1-piperazinyl)toluene with the major component chromatographically identical with a sample of 2-chloro-4-(1-piperazinyl)benzyl alcohol prepared by a different method. (Refer to Example 5 below.)

Purification: The material was recrystallized from ethyl acetate (about 800 ml.). An insoluble fraction (4.5 g.) was filtered off; this material was probably a salt of the product since in the above basic TLC system it behaved like 2-chloro-4-(1-piperazinyl)benzyl alcohol. On cooling the filtrate in an ice bath, 120 g. of cream-colored crystalline 2-chloro-4-(1-piperazinyl)benzyl alcohol, M.P. 120–122° C. (corr.), was obtained. A second crop of 23.5 g. was obtained from the mother liquor.

*Analysis.*—Calcd. for $C_{11}H_{15}ClN_2O$ (percent): N, 12.36; Cl, 15.64. Found (percent): N, 12.43; Cl, 15.44.

Infrared, ultraviolet and nuclear magnetic resonance spectral data of the above product show it to be identical with the product obtained hereinbelow (Example 5A) by reduction of the corresponding 2-chloro-4-(1-piperazinyl)benzaldehyde.

EXAMPLE 2

Fermentative enzymatic oxidation of 2-chloro-4-(2-diethylaminoethylamino)toluene to 2-chloro-4-(2-diethylaminoethylamino)benzyl alcohol was carried out following the procedure described in Example 1, using one 10-liter fermenter, Aspergillus sclerotiorum (SWRI A$_{24}$), a sterile soy-dextrose medium of the following composition Dextrose—800 g.
Soybean meal—150 g.
Yeast—50 g.
NaCl—50 g.
MgSO$_4$.7H$_2$O—2 g.
Na$_2$HPO$_4$.7H$_2$O—193 g.
NaH$_2$PO$_4$.H$_2$O—40 g.
Tap water—9.5 liters pH of about 7 prior to autoclaving at 120° C. and 15 lbs. p.s.i. for 15 minutes, 161 g. of 2-chloro-4-(2-diethylaminoethylamino)toluene hydrochloride added in 3–15 g. portions over a period of eight days, a conversion temperature of 29–30° C., an aeration rate of 5 liters/minute, an agitation rate of 450 r.p.m., 150 ml. of 10 N sodium hydroxide solution to terminate the fermentation, and two 20 liter portions of methylene dichloride to extract the product. A TLC on the extract showed good conversion to the corresponding benzyl alcohol, along with some of the corresponding 2-chloro - 4 - (2-diethylaminoethylamino) benzaldehyde, as shown by spraying the TLC plate with 2,4-dinitrophenylhydrazine. The methylene dichloride extract was concentrated in vacuo to an oil residue which was taken up with 200 ml. of anhydrous methanol. To this solution was added sodium borohydride in 2 g. portions until a TLC showed no more aldehyde to be present (total of 6 g. of NaBH$_4$ added) and a corresponding increase in the amount of the corresponding benzyl alcohol. The methanol was removed in vacuo and the residue taken up in 500 ml. of chloroform. This solution was washed several times with distilled water and the chloroform removed in vacuo. The remaining crystalline material was washed with n-hexane to yield 93 g. of the white crystalline product, 2-chloro - 4 - (2-diethylaminoethylamino)benzyl alcohol, M.P. 66.0–67.4° C. (corr.). A second crop weighing 13.5 g. was obtained from the mother liquor.

*Analysis.*—Calcd. for C$_{13}$H$_{21}$ClN$_2$O (percent): N, 10.91. Found (percent): N, 11.09.

Infrared spectral data of the above product show it to be identical with the product obtained by chemical methods as described hereinbelow, e.g., by reduction of ethyl 2-chloro-4-(2-diethylaminoethylamino)benzoate (Example 4A) and by reduction of ethyl 2-chloro-4-(diethylaminoacetamido)benzoate (Example 6A).

In the following Table A are listed other organisms which, when screened by the above-described general fermentative screening procedure, have been found to effect the oxidation of 2-chloro-4-(2-diethylaminoethylamino)toluene to produce 2-chloro-4-(2-diethylaminoethylamino)benzyl alcohol.

TABLE A

Order. Actinomycetales—
  Streptomyces griseus _____ SWRI S$_8$
Order: Melanconiales—
  Collectotrichum antramentarium _____ CMI 61249
Order: Actinomycetales—
  Aspergillus giganteum _____ SWRI A$_{22}$
  Aspergillus niger _____ ATCC 11394
  Aspergillus ochraeceus _____ ATCC 12337
  Aspergillus sclerotiorum _____ CMI 56673
  Aspergillus sclerotiorum Huber _____ CBS
  Aspergillus wentii _____ ATCC 1023
  Botrytis elliptica _____ ATCC 11787
  Fusarium solani _____ CBS
  Gliocladium deliquescens _____ ATCC 10097
  Penicillium adametzi _____ NRRL 738
  Penicillium griseofulvum _____ ATCC 11885
  Penicillium helicum _____ ATCC 10451
  Trichothecium roseum _____ ATCC 12519

TABLE A—Continued

Order: Mucorales—
  Cunninghamella bainieri _____ ATCC 9244
  Cunninghamella blankesleeana _____ ATCC 8688a(+)
  Cunninghamella elegans _____ ATCC 10028a(+)
  Cunninghamella elegans _____ ATCC 6795b(−)
  Cunninghamella elegans _____ ATCC 9246
  Cunninghamella elegans Lendner _____ CBS 9245
  Cunninghamella verticillata ___ ATCC 8983
Order: Sphaeriales—
  Botryosphaeria ribis _____ ATCC 11232
  Chaetomium cochliodes _____ ATCC 10195
  Chaetomium cristatum _____ ATCC 11201
  Hypomyces rosellus _____ CBS
Order: Sphaeropsidales
  Coniothyrium hellebori _____ CBS CBS—indicates the organism was obtained from the Centraal Bureau voor Schimmelcultures, Netherlands
ATCC—American Type Culture Collection number
CMI—Commonwealth Mycological Institute number
NRRL—Northern Regional Research Laboratory number
SWRI—Sterling-Winthrop Research Institute number; these organisms are available at SWRI, Rensselaer, N.Y.

Following the above-described screening procedure using *Aspergillus sclerotiorum* (SWRI A$_{24}$), 2-chloro-4-(4-propionyl-1-piperazinyl)benzyl alcohol was prepared from 2-chloro-4-(4-propionyl-1-piperazinyl)-toluene as its p-toluenesulfonate acid-addition salt, which was prepared as follows: To 21.0 g. of 1-(3-chloro-4-methylphenyl)piperazine and 50 cc. of pyridine was added, with cooling, 14.5 g. of propionic anhydride. The resulting mixture was allowed to stand at room temperature for three days, warmed on a steam bath, and then poured into water. The mixture was stirred for one hour and then extracted with ether. The ether extract was washed successively with aqueous sodium bicarbonate solution and water, dried over magnesium sulfate monohydrate, and concentrated to yield 26 g. of a viscous oily material. The oil was distilled to yield 21.5 g. of 2-chloro-4-(4-propionyl-1-piperazinyl)toluene, B.P. 175–183° C. at 0.1–0.2 mm. This product was treated with 17 g. of p-toluenesulfonic acid monohydrate in 100 cc. of warm absolute ethanol. The resulting precipitate was collected, washed with cold absolute ethanol, and dried overnight at 100° C. and 20 mm. to yield 29.5 g. of 2-chloro-4-(4-propionyl-1-piperazinyl) toluene p-toluenesulfonate, M.P. 194.0–195.2° C. (corr.).

*Analysis.*—Calcd. for C$_{14}$H$_{19}$ClN$_2$O.C$_7$H$_8$O$_3$S (percent): Cl, 8.08; N, 6.38. Found (percent): Cl, 8.35; N, 6.07.

EXAMPLE 3

Fermentative enzymatic oxidation of 2-chloro-4-(4-thiocarbamyl - 1 - piperazinyl)toluene to 2-chloro-4-(1-piperazinyl)benzyl alcohol [thiocarbamyl group removed as well as methyl group oxidized to hydroxymethyl] was carried out following the procedure described in Example 1, using three 10-liter fermenters, *Aspergillus sclerotiorum* (CMI 56673), a soy-dextrose medium of the following composition Dextrose—200 g.
Soybean meal—200 g.
NaCl—50 g.
Yeast—50 g.
K$_2$HPO$_4$—50 g.
Tap water—10 liters pH adjusted to 7.0 with 10 N HCl prior to autoclaving, and 25 g. of 2-chloro-4-(4-thiocarbamyl-1-piperazinyl)-toluene per fermenter. The innoculum (7%) was prepared from agar slant and growth in 700 ml. of the above medium for seventy-two hours at 26° C. on a rotary shaker at 410 r.p.m. The three 10-liter fermentations were carried out at 28° C. with an air flow of 5 liters per minute and were agitated at 450 r.p.m. After an initial twenty-five hours' growth, 5 g. portions of 2-chloro-4-(4-thiocarbamyl-1-pieprazinyl)toluene hydrochloride, each dissolved in 5 ml. of dimethylformamide, were added over a period of three days for a total of 25 g. in each tank. After seventy-two hours, the contents of each tank were made alkaline with concentrated ammonium hydroxide and extracted with 20 liters of methylene dichloride. The extracts were concentrated in vacuo and the residues combined. The resulting dark brown oil was mixed with 40 g. of silica gel and placed on a 300 g. silica gel column (3.5 x 45 cm.). The column was developed with increasing amounts of ether in n-hexane containing 1% triethylamine and finally with increasing amounts of methanol-in-ether containing 1% triethylamine. The latter fractions eluted with 10% methanol were combined, evaporated and the residue crystallized from a methanol-water mixture to yield 6 g. of crystalline solid. The solid was recrystallized from 100 ml. of isoamyl alcohol to yield 2.7 g. of solid. Two hundred mg. of the solid was dissolved in water, the solution made alkaline with a few drops of 10 N sodium hydroxide solution and extracted with methylene dichloride. Evaporation of the methylene dichloride in vacuo and drying the crystalline residue at 90° C. for ten hours yielded 130 mg. of 2-chloro-4-(1-piperazinyl)benzyl alcohol, whose infrared spectrum was found to be identical with the same product obtained hereinbelow in Example 5. By treating this compound in aqueous hydrochloric acid solution with a molar equivalent quantity of ammonium thiocyanate in water, warming the resulting solution, cooling the reaction mixture, and collecting the precipitate, there is obtained 2-chloro-4-(4-thiocarbamyl-1-piperazinyl)-benzyl alcohol.

EXAMPLE 4

(A) 2 - chloro-4-(2-diethylaminoethylamino) - benzyl alcohol: A solution of 2.5 g. of ethyl 2-chloro-4-(2-diethylaminoethylamino)benzoate in 35 ml. anhydrous ether was added to a slurry of 350 mg. lithium aluminum hydride in 75 ml. ether at room temperature. The reaction mixture was refluxed gently for thirty minutes, allowed to cool, and treated with an excess of 35% aqueous sodium hydroxide solution. The layers were separated and the aqueous layer extracted with ether. The ether extract was washed with water, dried over anhydrous $MgSO_4$, and concentrated to an oil weighing about 3 g. Chromatographic purification of the oil on a silica gel column (50 g., 2.5 x 25 cm.) developed with ether containing 5% triethylamine yielded one gram of material melting at 62–65° C. When recrystallized once from a benzene-n-hexane mixture, there was obtained 0.9 g. of 2-chloro-4-(2-diethylaminoethylamino)benzyl alcohol, M.P. 65.8–67.0° C. (corr.).

Analysis.—Calcd. for $C_{13}H_{21}ClN_2O$ (percent): N, 10.91; Cl, 13.81. Found (percent): N, 10.84; Cl, 13.36.

Reaction of 2-chloro-4-(2-diethylaminoethylamino)-benzyl alcohol with acetic anhydride, propionic anhydride, benzoyl chloride, 3,5-dinitrobenzoyl chloride, 4-ethoxybenzoyl chloride or unsubstittued-phenyl isocyanate yields the following respective 2-chloro-4-(2-diethylaminoethylamino)benzyl esters: acetate, propionate, benozate, 3,5-dinitrobenzoate, 4-ethoxybenzoate or carbanilate.

(B) The above intermediate ethyl 2-chloro-4-(2-diethylaminoethylamio)benzoate was prepared as follows: Twenty-six grams of ethyl 4-amino-2-chlorobenzoate and 52 g. of freshly distilled 2-diethylaminoethyl chloride were heated in a sealed tube at 180–190° C. for fifteen minutes. The contents of the cooled tube were treated with 300 ml. of water and the mixture (pH of 5) was washed with ether. The aqueous layer was made strongly basic with aqueous sodium hydroxide solution and extracted with ether. The product was extracted from the ether layers with 10% acetic acid. The acidic extract was basified with aqueous sodium hydroxide and extracted with ether. The ether extract was washed with water, dried over anhydrous $MgSO_4$ and concentrated to an oil weighing 8 grams. The oil in anhydrous ether was passed through a silica gel column (100 g., 2.5 x 50 cm.) using additional ether as the eluant to yield 5 g. of oil which was dissolved in 100 ml. of boiling absolute ethanol and treated with 4.5 g. of picric acid. After cooling, the crystalline solid that separated was collected and recrystallized from absolute ethanol to yield 7 g. of ethyl 2-chloro-4-(2-diethylaminoethylamino)benzoate as its picrate, M.P. 149.5–150.5° C.

Analysis.—Calcd. for $C_{15}H_{23}ClN_2O_2 \cdot C_6H_3N_3O_7$ (percent): N, 13.27; Cl, 6.72. Found (percent): N, 13.30; Cl, 6.98.

The picrate was decomposed with aqueous sodium hydroxide solution, the product extracted with ether, and the residue distilled to yield 2.5 g. of ethyl 2-chloro-4-(2-diethylaminoethylamino)benzoate, a light colored oil boiling at 190–194° C. at 0.5 mm.

EXAMPLE 5

(A) 2-chloro-4-(1-piperazinyl)benzyl alcohol: A solution of 4 g. of 1-(3-chloro-4-carbethoxyphenyl)piperazine in 15 ml. of anhydrous ether was added to a slurry of 600 mg. of lithium aluminum hydride in 500 ml. of ether at 0° C. The vigorously stirred reaction was treated with an excess of 35% aqueous sodium hydroxide solution after one hour; the layers were separated; and, the aqueous layer was extracted with ether. The ether extract was dried over anhydrous magnesium sulfate and concentrated to a waxy solid. The solid was recrystallized once from ethyl acetate-n-pentane and once from isopropyl acetate to yield 1.4 g. of 2-chloro-4-(1-piperazinyl)benzyl alcohol, M.P. 121.4–123.2° C. (corr.).

Analysis.—Calcd. for $C_{11}H_{15}ClN_2O$ (percent): N, 12.36; Cl, 15.64. Found (percent): N, 12.15; Cl, 15.87.

2-chloro-4-(1-piperazinyl)benzyl alcohol hydrochloride: To 1 g. of 2-chloro-4-(1-piperazinyl)benzyl alcohol dissolved in acetone was added an excess of 9 N HCl in ethanol. The precipitate was collected, recrystallized from ethanol-acetone, and dried at 95° C. for twelve hours to yield 1.2 g. of the white crystalline 2-chloro-4-(1-piperazinyl)benzyl alcohol hydrochloride, M.P. 157.0–159.0° C. (corr.) with decomposition.

Analysis.—Calcd. for $C_{11}H_{15}ClN_2O \cdot HCl$ (percent): Cl, 26.94; N, 10.64. Found (percent): Cl, 26.72; N, 10.52.

(B) The above intermediate 1-(4-carboethoxy-3-chlorophenyl)piperazine was prepared as follows: A solution of 24 g. of ethyl 4-amino-2-chlorobenzoate and 34 g. of bis(2-bromoethyl)amine hydrobromide in 500 ml. of n-butanol was refluxed for one hour and after standing overnight was treated with 13 g. of anhydrous sodium carbonate. After thirty hours of refluxing, the n-butanol was removed under reduced pressure leaving a waxy solid. The material was freed from inorganic salts by digesting it in absolute ethanol, filtering the mixture through infusorial earth, and adding ether to the filtrate to reprecipitate the product; after two such treatments, the product as the hydrobromide salt weighed 10 g. The free base was extracted from a basic solution with ether and distilled, B.P. 165–175° C./0.05 mm. A picrate was prepared and recrystallized from ethanol, M.P. 235–237° C.

Analysis.—Calcd. for $C_{13}H_{17}ClN_2O_2 \cdot C_6H_3N_3O_7$ (percent): N, 14.06. Found (percent): N, 13.53.

EXAMPLE 6

(A) 2-chloro-4-(2-diethylaminoethylamino)benzyl alcohol from ethyl 2-chloro-4-(diethylaminoacetamido)-benzoate: A solution of 23.4 g. of aluminum chloride in 300 ml. of tetrahydrofuran was added all at once, but cautiously, to a mixture of 52 g. of lithium aluminum hydride in 2000 ml. of tetrahydrofuran and the mixture was cooled to −12° C. The free base from 117 g. of ethyl 2-chloro-4-(diethylaminoacetamido)benzoate hydrochloride was dissolved in 200 ml. of tetrahydrofuran and the solution was added with efficient stirring over a period of forty-five minutes to the solution of lithium aluminum hydride and aluminum chloride. The temperature during the addition was maintained at −12° C. to −8° C. using a mixture of solid carbon dioxide and acetone. The reaction was stirred for six hours at −12° C. to −6° C. and then carefully hydrolyzed with 165 ml. of 35% sodium hydroxide solution. In order to break the emulsion, 20 g. of finely ground potassium hydroxide was added. The mixture was filtered and the filter cake was washed twice with tetrahydrofuran. The filtrate was concentrated in vacuum. The residue, 84 g., was dissolved in 75 ml. benzene and then 100 ml. n-pentane was added. The resulting slightly yellow crystalline product was collected and found to weight 44.5 g. (46%), M.P. 64–67° C. Recrystallization from benzene-n-pentane, using decolorizing charcoal, afforded 44 g. of 2-chloro-4-(2-diethylaminoethylamino)benzyl alcohol, M.P. 66–68° C.

Following the procedure of Example 6A using a molar equivalent quantity of the corresponding lower-alkyl, e.g., ethyl, 2 - halo - 4-[di-(lower-alkyl)aminoacetylamino]-benzoate, the following 2-halo-4-[2-di-(lower-alkyl)-aminoethylamino]benzyl alcohols are obtained: halo is Br and lower-alkyl is ethyl; halo is Cl and lower-alkyl is n-butyl; halo is Cl and lower-alkyl is methyl; and, halo is Cl and lower-alkyl is n-hexyl.

(B) The intermediate ethyl 2-chloro-4-(diethylaminoacetamido)benzoate used in Example 6A was prepared as follows: A mixture of 133 g. of ethyl 2-chloro-4-(chloroacetamido)benzoate and 106 g. of diethylamine in 1 liter of dry benzene was refluxed for four hours. The reaction mixture was concentrated to about half of its volume and washed with water. The organic layer was extracted with dilute hydrochloric acid. After washing the acidic extracts with ether, the solution was basified and extracted with ether. The ether extracts were dried over anhydrous calcium sulfate and then concentrated. The residue was dissolved in isopropyl alcohol and the hydrochloride was prepared by adding one equivalent of concentrated hydrochloric acid, followed by ether until the solution was almost cloudy. After cooling, the crystalline product was collected to yield 144 g. (86%) of ethyl 2-chloro-4-(diethylaminoacetamido)benzoate hydrochloride, M.P. 150–151° C.

(C) The intermediate ethyl 2-chloro-4-(chloroacetamido)benzoate used in Example 6B was prepared as follows: To a refluxing solution of 115 g. of ethyl 4-amino-2-chlorobenzoate in 350 ml. ethylene dichloride was added slowly a solution of 68 g. of chloroacetyl chloride dissolved in 210 ml. ethylene dichloride. The mixture was refluxed for ninety minutes and then diluted with 1 liter of n-pentane. After cooling in the refrigerator overnight, the precipitate was collected and washed well with n-pentane to yield 133 g. (83%) of ethyl 2-chloro-4-(chloroacetamido)benzoate, M.P. 119–122° C.

EXAMPLE 7

(A) 2-chloro-4-(4-ethyl-1-piperazinyl)benzyl alcohol from 2-chloro-4-(4-ethyl-1-piperazinyl)benzaldehyde: To a solution containing 4.0 g. og 2-chloro-4-(4-ethyl-1-piperazinyl)benzaldehyde (see Example 7B) in 45 ml. of absolute ethanol was added 10 ml. of a 50% solution of sodium borohydride in ethanol. The resulting mixture was stirred at room temperature for one hour and then allowed to stand over the weekend. After removal of the alcohol by distillation in vacuo, 20 ml. of 20% aqueous sodium hydroxide solution was added and the resulting mixture was extracted three times with ether. The ether extract was dried over anhydrous magnesium sulfate and the ether removed to yield an oil which solidified on cooling. The solid was recrystallized twice from benzene-n-hexane, using decolorizing charcoal the second time, and dried at 75° C. for three hours at 20 mm. to yield 1.8 g. of 2-chloro-4-(4-ethyl-1-piperazinyl)benzyl alcohol, M.P. 96.8–99.0° C. (corr.).

Analysis.—Calcd. for $C_{13}H_{19}ClN_2O$ (percent): Cl, 13.91; N, 11.00. Found (percent): Cl, 13.78; N, 11.05.

(B) The above intermediate 2-chloro-4-(4-ethyl-1-piperazinyl)benzaldehyde was prepared as follows: To a solution under an atmosphere of nitrogen and containing 10.0 g. of sodium 5-nitro-o-toluenesulfonate, 1.6 g. of ammonium chloride and 40 ml. of distilled water was added 8 g. of zinc dust (90%) in two portions, while cooling the reaction mixture to keep the temperature below 70° C. The excess zinc dust was filtered off and washed with 25 ml. of water; 2.4 ml. of concentrated hydrochloric acid was added to the filtrate. The resulting solution was added to a solution obtained by dissolving 6.0 g. of 1-(3-chlorophenyl)-4-ethylpiperazine in a mixture of 4.0 ml. of concentrated hydrochloric acid and 0.5 ml. of water followed by addition of 2.3 ml. of 37% aqueous formaldehyde, the first solution being added to the second immediately after addition of the formaldehyde to form the second solution. The reaction mixture was then allowed to stand at room temperature for two days, 50 ml. of a saturated solution of sodium chloride in water was added, and the resulting mixture was neutralized to a pH of 6.8–7.0 with ammonium hydroxide, whereupon a gummy yellow precipitate separated. The residue was stirred in an ice bath for thirty minutes and the resulting gummy precipitate was collected. To the precipitate was added 50 ml. of water and 25 ml. of ammonium hydroxide, the mixture was heated below its boiling point for ten minutes, cooled and extracted four times with 100 ml. of ether. The ether extract was dried over anhydrous magnesium sulfate and the ether removed to yield, as a viscous yellow oil, 4.0 g. of 2-chloro-4-(4-ethyl-1-piperazinyl)benzaldehyde. Infra-red spectral analysis of this compound showed it to have a carbonyl group. Also, it was converted into its thiosemicarbazone, M.P. 223.0–223.5° C. (corr.) with decomposition.

Analysis.—Calcd. for $C_{14}H_{20}ClN_5S$ (percent): Cl, 10.88; S, 9.84. Found (percent): Cl, 11.18; S, 9.46.

(C) The intermediate 1-(3-chlorophenyl)-4-ethylpiperazine used in Example 7B was prepared as follows: A mixture containing 15 g. of 1-(3-chlorophenyl)piperazine, 6 ml. of ethyl bromide and 100 ml. of benzene was refluxed for three hours. The white solid [1-(3-chlorophenyl)piperazine hydrobromide] that separated was filtered off, 15 ml. of ethyl bromide was added to the filtrate and refluxing was continued for another four hours. The mixture was stirred at room temperature overnight and another 3.5 g. of 1-(3-chlorophenyl)piperazine hydrobromide was filtered off. The filtrate was concentrated in vacuo and the remaining oil was dissolved in anhydrous ether and filtered through infusorial earth (Super-Cel®). To the filtrate was added 7.9 ml. of 9.7 N ethanolic hydrogen chloride. The resulting white precipitate was collected, air-dried and recrystallized from about 400 ml. of acetone to yield 5.0 g. of 1-(3-chlorophenyl)-4-ethylpiperazine hydrochloride, M.P. 206–208° C., after drying at 70° C. at 20 mm. for one hour. A second crop of 1.5 g., M.P. 208–209° C., was obtained by concentrating the filtrate to 100 ml. For analysis, a 0.5 g. sample of the first crop was placed in an oven at 70° C. and 20 mm. overnight.

Analysis.—Calc'd for $C_{12}H_{17}ClN_2 \cdot HCl$ (percent): N, 10.72. Found (percent): N, 10.78.

EXAMPLE 8

(A) 2-chloro-4-(4-methyl-1-piperazinyl)benzyl alcohol from 2-chloro-4-(4-methyl-1-piperazinyl)-benzaldehyde: To a solution of 12 g. of 2-chloro-4-(4-methyl-1-piperazinyl)benzaldehyde (Example 8B) in 100 ml. of methanol was added 50 ml. of water. The resulting cloudy solution was cooled and to it was added 2.0 g. of sodium borohydride in 20 ml. of water, followed by an additional 1 g. of sodium borohydride in 10 ml. of water. The resulting mixture was allowed to stand overnight. Most of the methanol was then removed by distilling in vacuo; 15 ml. of 35% aqueous sodium hydroxide was added to the aqueous mixture; and, the alkaline solution was extracted three times with ether. The extracts were dried over anhydrous magnesium sulfate and concentrated in vacuo to yield an oily material which solidified on standing. The solid was recrystallized once from benzene-n-pentane and once from benzene to yield 4.5 g. of 2-chloro-4-(4-methyl-1-piperazinyl)-benzyl alcohol, M.P. 119.4–121.6° C. (corr.) when dried at 60° C. and 20 mm. for four hours. The structure of the product was confirmed by its infrared spectrum and the following analysis.

Analysis.—Calc'd for $C_{12}H_{17}ClN_2O$ (percent): Cl, 14.72; N, 11.63. Found (percent): Cl, 14.72; N, 11.82.

(B) The above intermediate 2-chloro-4-(4-methyl-1-piperazinyl)benzaldehyde was prepared following the procedure described in Example 7B using 29.0 g. of sodium 5-nitro-o-toluenesulfonate, 4.4 g. of ammonium chloride, 115 ml. of distilled water, 23 g. of zinc dust (90%), 70 ml. of wash water and 10.5 ml. of concentrated hydrochloric acid to form the first solution; and, 18.5 g. of 1-(3-chlorophenyl)-4-methylpiperazinyl in a mixture of 11.6 ml. of concentrated hydrochloric acid and 1 ml. of water, followed by addition of 6.4 ml. of 37% aqueous formaldehyde to form the second solution. The solutions were mixed and the reaction mixture worked-up as in Example 7B. There was obtained, as an oil, 15 g. of 2-chloro-4-(4-methyl-1-piperazinyl)benzaldehyde. Its IR spectrum in chloroform showed a carbonyl group; and, its semicarbazone melted at 231–233° C. and analyzed as follows.

Analysis.—Calc'd for $C_{13}H_{18}ClN_5O$ (percent): Cl, 11.99; N, 23.68. Found (percent): Cl, 12.32; N, 24.28.

(C) The intermediate 1-(3-chlorophenyl)-4-methylpiperazine used in Example 8B was prepared as follows: To a solution containing a 43 g. portion of 1-(3-chlorophenyl)piperazine in 40 ml. of formic acid was added 18 ml. of 37% formaldehyde solution. The reaction mixture was refluxed for five hours, cooled, treated with 18 ml. of concentrated hydrochloric acid and concentrated in vacuo. Water was added and the solution was made basic with 10% aqueous potassium hydroxide solution. The alkaline mixture was extracted with methylene dichloride, the extracts dried over anhydrous magnesium sulfate, the methylene dichloride evaporated off, and the oily residue distilled to yield an 18.5 g. fraction of 1-(3-chlorophenyl)-4-methylpiperazine boiling at 115–125° C. at 0.3 mm.

EXAMPLE 9

(A) 2-chloro-4-(2-diethylaminoethylamino)-3,5-dimethylbenzyl alcohol was prepared from 2-chloro-4-(2-diethylaminoethylamino)-3,5-dimethylbenzaldehyde following the procedure described in Example 7A using 7.5 g. of 2-chloro-4-(2-diethylaminoethylamino)-3,5-dimethylbenzaldehyde (Example 9B), 50 ml. of absolute ethanol and 1 g. of sodium borohydride. There was obtained 1 g. of an oily product which was dissolved in 5 ml. of absolute ethanol, and the solution treated with 0.4 g. of p-toluenesulfonic acid monohydrate followed by addition of 40 ml. of anhydrous ether. The solid that separated was collected to yield 0.90 g. of 2-chloro-4-(2-diethylaminoethylamino)-3,5-dimethylbenzyl alcohol as its di-(p-toluenesulfonate), M.P. 154.0–154.6° C. (corr.) with decomposition.

Analysis.—Calcd. for $C_{15}H_{25}ClN_2O \cdot 2C_7H_8O_3S$ (percent): C, 55.35; H, 6.57; N, 4.45; S, 10.19. Found (percent): C, 55.15; H, 6.56; N, 4.22; S, 10.09.

(B) The above intermediate 2-chloro-4-(2-diethylaminoethylamino)-3,5-dimethylbenzaldehyde was prepared following the procedure described in Example 7B using 25.0 g. of sodium 5-nitro-o-toluenesulfonate, 4.4 g. of ammonium chloride, 100 ml. of water, 20.0 g. of zinc dust (90%), 62 ml. of wash water, 4.4 ml. of concentrated hydrochloric acid, 22.0 g. of 3-(2-diethylaminoethylamino)-2,4-dimethylchlorobenzene, a mixture of 10 ml. of concentrated hydrochloric acid and 30 ml. of water, and 5.7 ml. of 37% formaldehyde solution. There was thus obtained, as an oil, 7.5 g. of 2-chloro-4-(2-diethylaminoethylamino)-3,5-dimethylbenzaldehyde.

(C) The intermediate 3-(2-diethylaminoethylamino)-2,4-dimethylchlorobenzene used in Example 9B was prepared as follows: A mixture containing 22 g. of 3-chloro-2,6-dimethylaniline, 15.5 g. of freshly distilled 2-diethylaminoethyl chloride and 100 ml. of benzene was refluxed for twenty-seven hours. The reaction mixture was concentrated in vacuo and the viscous oily residue was heated at 100° C. and 0.1 mm. To the residue was added about 400 ml. of ether and the mixture was cooled in a bath of solid carbon dioxide and acetone, whereupon the gummy product solidified. The solid was collected and recrystallized from isopropyl alcohol-ether to yield 5.4 g. of 3-(2-diethylaminoethylamino)-2,4-dimethylchlorobenzene, M.P. 104–106° C.

Analysis.—Calcd. for $C_{14}H_{23}ClN_2$ (percent): N, 9.62. Found (percent): N, 9.58.

(D) 2-chloro-4-(2-diethylaminoethylamino)benzyl alcohol (0.8 g., M.P. 64.0–65.5° C.) was obtained from 2-chloro-4-(2-diethylaminoethylamino)benzaldehyde (3 g.) following the procedure described above in Example 9A using 15 ml. of methanol and 1 g. of sodium borohydride.

EXAMPLE 10

(A) 2-chloro-4-(4-formyl-1-piperazinyl)benzaldehyde: To 100 ml. of dimethylformamide was added dropwise 51.7 g. of phosphorous oxychloride. After the exothermic reaction had subsided, the solution was cooled and 86.0 g. of 1-(3-chlorophenyl)-4-formylpiperazine (Example 10B) was added. The reaction mixture was stirred on a steam bath for two hours, cooled and poured onto ice. Sodium hydroxide was added to adjust the pH to about 4 and then a saturated sodium acetate solution was added to a pH of about 6. The mixture was extracted with chloroform, the chloroform extract concentrated in vacuo, and 500 ml. of hot isopropyl acetate was added to the viscous residue. The hot supernatant liquid was decanted from a small amount of gummy residue, treated with decolorizing charcoal, filtered, and allowed to cool. The resulting precipitate was collected to yield 33 g. of 2-chloro-4-(4-formyl-1-piperazinyl)benzaldehyde, M.P. 120–122° C. A second crop of 20 g. of this product was obtained by concentrating the filtrate. 2-chloro-4-(4-formyl-1-piperazinyl)benzaldehyde is also obtained following the above procedure but using in place of dimethylformamide a molar equivalent quantity of diethylformamide, N-methyl-N-(unsubstituted-phenyl)formamide or N-(4-methoxyphenyl)-N-methylformamide or using a molar equivalent quantity of phosphorous oxybromide in place of phosphorousoxychloride.

(B) The above intermediate 1-(3-chlorophenyl)-4-formylpiperazine was prepared as follows: A mixture containing 78.6 g. of 1-(3-chlorophenyl)piperazine, 22.2 g. of formic acid and 100 ml. of benzene was refluxed for two hours with a water-separator connected to the reaction vessel; 9 ml. of water was collected. The reaction mixture was concentrated in vacuo and the residue distilled under reduced pressure to yield 86.0 g. of 1-(3-chlorophenyl)-4-formylpiperazine, distilling at 153–164° C. at 0.1 mm.

(C) 2-chloro-4-(1-piperazinyl)benzaldehyde: A mixture containing 53 g. of 2-chloro-4-(4-formyl-1-piperazinyl)benzaldehyde and 150 ml. of 7% aqueous hydrochloric acid solution was stirred on a steam bath for fifteen minutes and cooled. The precipitate was collected and washed with acetone to yield 39.9 g. of 2-chloro-4-

(1-piperazinyl)benzaldehyde as its hydrochloride, M.P. 260° C. with decomposition. A 10 g. sample was recrystallized from water-methanol using decolorizing charcoal and found to melt at 257.0–258.0° C. (corr.) with decomposition.

*Analysis.*—Calcd. for $C_{11}H_{13}ClN_2O \cdot HCl$ (percent): Cl, 27.15; N, 10.73. Found (percent): Cl, 27.35; N, 10.80.

2-bromo - 4 - (1--piperazinyl)benzaldehyde, 2-iodo-4-(1-piperazinyl)benzaldehyde or 2-fluoro-4-(1-piperazinyl) benzaldehyde is obtained by following the procedures of Examples 10B, 10A and 10C, respectively, starting with the appropriate 1-(3-halophenyl)piperazine in Example 10B.

(D) 2-chloro-4-(1 - piperazinyl)benzyl alcohol: To a solution containing 28.5 g. of 2-chloro-4-(1-piperazinyl) benzaldehyde hydrochloride in 200 ml. of methanol was added 8 ml. of 35% sodium hydroxide solution, and the mixture cooled to 0° C. To this cooled solution was added a solution of 4.5 g. of sodium borohydride in 40 ml. of water and the resulting mixture stirred in an ice bath for thirty minutes (initial temperature rose to 25° C.). The methanol was removed by distilling in vacuo on a steam bath and the residue was heated with 50 ml. of water, cooled and then extracted with chloroform. The extract was dried over anhydrous calcium sulfate, treated with decolorizing charcoal, filtered, and concentrated in vacuo, to remove the chloroform. There was thus obtained 23.2 g. of 2-chloro-4-(1-piperazinyl)benzyl alcohol, M.P. 118–120° C.

2-bromo-4-(1-piperazinyl)benzyl alcohol, 2-iodo-4-(1-piperazinyl)benzyl alcohol or 2-fluoro-4-(1-piperazinyl) benzyl alcohol is obtained following the procedure of Example 10D using the appropriate 2-halo-4-(1-piperazinyl)benzaldehyde as its hydrochloride.

EXAMPLE 11

(A) 2-chloro-4-(4-benzoyl-1-piperazinyl)-benzaldehyde was prepared following the procedure described in Example 10A using 4.1 ml. of phosphorous oxychloride, 50 ml. of dimethylformamide and 15.0 g. of 1-(3-chlorophenyl)-4-benzoylpiperazine, and a heating period of four hours. The product which separated when the reaction mixture was made alkaline with sodium hydroxide was collected and recrystallized from isopropyl alcohol to yield 7.9 g. of 2-chloro-4-(4-benzoyl-1-piperazinyl)benzaldehyde, M.P. 155–160° C.

(B) The above intermediate 1-(3-chlorophenyl)-4-benzoylpiperazine was prepared as follows: To a solution containing 30.0 g. of 1-(3-chlorophenyl)-piperazine in 200 ml. of water and 50 ml. of ethanol cooled to 0.° C. was added simultaneously, over a period of about thirty minutes at 0° to 3° C. with stirring, 32.2 g. of benzoyl chloride and 25 ml. of 25% sodium hydroxide solution. To the mixture was added 100 ml. of ethanol and the resulting solution was stirred at 0° C. for two hours and then placed in a refrigerator for three days. The reaction mixture was then extracted with ether and the ether extract washed three times with water. The ether extract was extracted with 7% hydrochloric acid solution; however, on solidification of the acidic extract no product separated. The ether solution was then dried over anhydrous calcium sulfate and concentrated in vacuo to remove the ether. The residue was heated on a steam bath under high vacuum (about 0.5 mm.) to remove a few ml. of ethyl benzoate. The residue was then recrystallized from ether, washed successively with cold ether and n-pentane to yield 36.6 g. of 1-(3-chlorophenyl)-4-benzoylpiperazine, M.P. 75–77° C.

*Analysis.*—Calcd. for $C_{17}H_{17}ClN_2O$ (percent): Cl, 11.79; N, 9.32. Found (percent): Cl, 11.94; N, 9.33.

(C) 2-chloro-4-(1-piperazinyl)benzaldehyde was obtained following the procedure described in Example 10C using 10 g. of 2-chloro-4-(4-benzoyl-1-piperazinyl)benzaldehyde, 25 ml. of concentrated hydrochloric acid, 25 ml. of ethanol and a reflux period of five hours. There was thus obtained 3.5 g. of the compound, M.P. 252° C. with decomposition.

EXAMPLE 12

(A) 2 - chloro - 4 - {4-[6-(4-tertiary-pentylphenoxy)hexyl]-1-piperazinyl}benzyl alcohol was prepared following the procedure described in Example 7A using 15 g. of 2 - chloro - 4 - {4-[6-(4-tertiary-pentylphenoxy)hexyl]-1-piperazinyl}benzaldehyde, 100 ml. of methanol and 2 g. of sodium borohydride. The product was isolated from the reaction mixture by successive chromatographic separations on silica gel columns (100 g. each time, 2.5 x 50 cm.), first using 3% isopropylamine in ether and then 2% isopropylamine in ether. After recrystallization from methanol, there was thus obtained 0.9 g. of 2-chloro-4-{4-[6 - (4-tertiary-amylphenoxy)hexyl]-1-piperazinyl}benzyl alcohol, M.P. 71.8–73.6° C. (corr.).

*Analysis.*—Calcd. for $C_{28}H_{41}ClN_2O_2$ (percent): C, 71.08; H, 8.74; N, 5.92. Found (percent): C, 70.96; H, 8.91; N, 6.21.

(B) The above intermediate 2-chloro-4-{4-[6-(4-tertiary - pentylphenoxy)hexyl] - 1-piperazinyl}benzaldehyde was prepared as follows: To 12 ml. of dimethylformamide cooled to 5° C. was added dropwise 3.7 ml. of phosphorous oxychloride. To this solution was added slowly over a period of seventy-five minutes, keeping the temperature at 10°–20° C., a solution of 17.6 g. of 1-(3-chlorophenyl) - 4 - [6 - (4-tertiary-amylphenoxy)hexyl] piperazine in 12 ml. of dimethylformamide. The resulting thick paste was stirred at room temperature for two hours and fifteen minutes, and then heated on a steam bath with stirring for two and one-half hours. The hot reaction mixture was poured onto ice and the resulting solution neutralized with 10% sodium hydroxide solution. The alkaline mixture was extracted with ether; the extract was dried over anhydrous calcium chloride and concentrated in vacuo to remove the ether. There was thus obtained, as an oil, 15 g. of 2-chloro-4-{4-[6-(4-tertiary-pentylphenoxy)hexyl]-1-piperazinyl}benzaldehyde.

(C) The intermediate 1-(3-chlorophenyl)-4-[6-(4-tertiary - amylphenoxy)hexyl]piperazine used in Example 12B was prepared as follows: A mixture containing 49 g. of 1-(3-chlorophenyl)piperazine, 50.5 g. of triethylamine, 81.5 g. of 6-(4-tertiary-amylphenoxy)hexyl bromide and 500 ml. of toluene was refluxed for six hours and filtered to remove some precipitated triethylamine hydrobromide. About 500 ml. of ether was added to the reaction mixture to precipitate more triethylamine hydrobromide and the resulting mixture was filtered through infusorial earth (Super-Cel). The filtrate was heated in vacuo to remove the solvents and yield 106 g. of an oil. A 10 g. sample of the oil was dissolved in ether and treated with a solution of hydrogen chloride in ethanol. The gummy precipitate was collected, recrystallized from about 200 ml. of isopropyl acetate, dried at 85° C. and 20 mm. to yield 9 g. of 1 - (3 - chlorophenyl) - 4-[6 - (4-tertiary-amylphenoxy) hexyl]piperazine hydrochloride, M.P. 119–121° C. The remainder of the above oil (96 g.) was passed through a 200 g. column of silica gel in a 2% solution of isopropyl amine in ether. The first fraction of 1 liter yielded 59 g. of colorless oil which was taken up in 500 ml. of ether and treated with 17.5 ml. of 7.6 N ethanolic hydrogen chloride. The precipitate was collected, dried at 70° C. and 20 mm. for five hours to yield an additional 62 g. of 1-(3-chlorophenyl) - 4-[6-(4-tertiary-amylphenoxy)hexyl]piperazine hydrochloride, M.P. 116–119° C.

(D) The intermediate 6 - (4 - tertiary - amylphenoxy) hexyl bromide used in Example 12C was prepared as follows: A solution of sodium 4-tertiary-amylphenoxide was prepared by mixing 75 g. of 4-tertiary-amylphenol, 18 g. of sodium hydroxide and 600 ml. of isopropyl alcohol. This solution was added over a period of one hour to a refluxing solution of 1,6-dibromohexane in 600 ml. of isopropyl alcohol. The resulting reaction mixture was refluxed for one hour, about half of the solvent was removed in vacuo, and the remaining reaction mixture was poured into water. The mixture was extracted with ether; the ether extract was washed successively with 5% sodium hydroxide solution and twice with water, and then dried over anhydrous calcium chloride. The residue was distilled in vacuo to yield 98.0 g. of 6-(4-tertiary-amylphenoxy) hexyl bromide, distilling at 90–112° C. at 0.05 mm., $n_D^{25}=1.5190$.

EXAMPLE 13

2 - chloro-4-[4-(3-carboxy-2-propenoyl)-1-piperazinyl] benzyl alcohol—A solution of 2.5 g. of maleic anhydride in 100 ml. of benzene was added with stirring to a solution of 2.6 g. of 2-chloro-4-(1-piperazinyl)benzyl alcohol in 500 ml. of benzene over a period of thirty minutes. A slight rise in temperature to 40° C. was noted. After one hour, the finely divided solid was collected and dried for two hours at 0.1 mm. and room temperature to yield 3.2 g. of 2 - chloro - 4 - [4 - (3 - carboxy-2-propenoyl)-1-piperazinyl]benzyl alcohol, M.P. 145.0–146.0° C. (corr.).

Analysis.—Calcd. for $C_{15}H_{17}ClN_2O_4$ (percent): C, 10.92; N, 8.63. Found (percent): C, 10.75; N, 8.38.

EXAMPLE 14

Fermentative enzymatic oxidation of 2-chloro-4-[4-(2-hydroxyethyl)-1-piperazinyl]toluene to 2-chloro-4-[4-(2-hydroxyethyl)-1-piperazinyl]benzyl alcohol was carried out following the procedure described in Example 2 using 4.0 g. of 2-chloro-4-[4-(2-hydroxyethyl)-1-piperazinyl] toluene and a reaction period of two days, all other reaction conditions being the same as in Example 2. The product was isolated as follows: The oily residue after evaporation of the methylene dichloride was mixed with 30 g. of silica gel and placed on a 150 g. silica gel column (3.7 x 21 cm.) and the column was developed, first using increasing amounts of ether in n-hexane, and then using increasing amounts of methanol in ether (0.5% to 8% methanol), all solvents containing 0.5% triethylamine. The fractions collected with 3%–8% of methanol in ether were combined and evaporated to yield an oily residue. The residue was crystallized from ethyl acetate using decolorizing charcoal and then recrystallized from ethyl acetate to yield 2.28 g. of 2-chloro-4-[4-(2-hydroxyethyl)-1-piperazinyl]benzyl alcohol, M.P. 99.0–101.6° C. (corr.), after drying in a vacuum oven at 50° C. for twelve hours.

Analysis.—Calcd. for $C_{13}H_{19}ClN_2O_2$ (percent): Cl, 13.10; N, 10.35. Found (percent): Cl, 13.44; N, 10.06.

EXAMPLE 15

Fermentative enzymatic oxidation of 2-chloro-4-(2-diethylaminoethylamino)-3,5-dimethyltoluene to 2-chloro-4 - (2 - diethylaminoethylamino)-3,5-dimethylbenzyl alcohol was carried out following the procedure described in Example 2 using 6.5 g. of 2-chloro-4-(2-diethylaminoethylamino)-3,5-dimethyltoluene hydrochloride and a reaction period of three days, all other reaction conditions being the same as in Example 2. The product was isolated as follows: The oily residue after evaporation of the methylene dichloride was mixed with 30 g. of silica gel and placed on a 150 g. silica gel column (3.7 x 21 cm.) and the column was developed using increasing amounts of ether in n-hexane and finally with increasing amounts of methanol in ether, all solvents containing 0.5% triethylamine. The fractions collected with 99.5% ether and 0.5% triethylamine were combined and evaporated to yield, as an oil, 2-chloro-4-(2-diethylaminoethylamino)-3,5-dimethylbenzyl alcohol.

EXAMPLE 16

2 - chloro-4-(4-acetyl-1-piperazinyl)benzyl alcohol: To a solution containing 6.0 g. of 2-chloro-4-(1-piperazinyl) benzyl alcohol in 6 cc. of pyridine was added 4 cc. of acetic anhydride. The resulting reaction mixture was heated on a steam bath for ten minutes and then allowed to cool to room temperature. The resulting precipitate was collected, washed successively with n-hexane and ether, recrystallized from ethyl acetate using declorizing charcoal, an dried in a vacuum oven at 70° C. for eight hours to yield 4.8 g. of 2-chloro - 4 - (4-acetyl-1-piperazinyl)benzyl alcohol, M.P. 147.0–151.0° C. (corr.).

Analysis.—Calcd. for $C_{13}H_{17}N_2O_2Cl$ (percent): Cl, 13.19; N, 10.43. Found (percent): Cl, 13.22; N, 10.12.

Infrared spectral data of the above compound showed the presence of N-acetyl rather than O-acetyl. Running the above reaction using double the quantity of acetic anhydride, there is obtained 2-chloro-4-(4-acetyl-1-piperazinyl)benzyl acetate.

EXAMPLE 17

Fermentative enzymatic oxidation of 2-chloro-4-(4-benzyl-1-piperazinyl)toluene to 2 - chloro-4-(4-benzyl-1-piperazinyl)benzyl alcohol was carried out following the procedure described in Example 2 using 5.0 g. of 2-chloro-4 - (4 - benzyl-1-piperazinyl)toluene hydrochloride and a reaction period of forty hours, all other reaction conditions being the same as in Example 2. The product was isolated as follows: The residue after evaporation of the methylene dichloride was mixed with 30 g. of silica gel and placed on a 150 g. silica gel column (3.5 x 25 cm.) and the column was developed as in Example 15. The fractions collected with 60–90% ether in n-hexane and 0.5% triethylamine were combined and evaporated to yield a residue which was crystallized twice from ethyl acetate and once from isopropyl acetate to yield 1.23 g. of 2 - chloro - 4 - (4-benzyl-1-piperazinyl)benzyl alcohol, M.P. 107.0–110.8° C. (corr.).

Analysis.—Calcd. for $C_{18}H_{21}ClN_2O$ (percent): Cl, 11.19; N, 8.84. Found (percent). Cl, 11.22; N, 8.49.

EXAMPLE 18

Fermentative enzymatic oxidation of 2 - chloro-4-(4-allyl-1-piperazinyl)toluene to 2-chloro-4-(4-allyl-1- piperazinyl)benzyl alcohol was carried out following the procedure described in Example 2 using 6.0 g. of 2-chloro-4-(4-allyl-1-piperazinyl)toluene hydrochloride and a reaction period of forty hours. The product was isolated as in Example 17; the fractions collected with 55–75% ether in n-hexane and 0.5% triethylamine were combined and evaporated to yield a residue which was crystallized from ethyl acetate using decolorizing charcoal to yield 3.0 g. of 2-chloro-4-(4-allyl-1-piperazinyl) benzyl alcohol, M.P. 91.0–93.0° C. (corr.).

Analysis.—Calcd. for $C_{14}H_{19}ClN_2O$ (percent): Cl, 13.29; N, 10.50. Found (percent): Cl, 13.54; N, 10.22.

EXAMPLE 19

3-chloro-N-(2-diethylaminoethyl) - 4 - methoxymethyl-2,6 - dimethylaniline: When 2-chloro-4-(2-diethylaminoethylamino) - 3,5 - dimethylbenzyl alcohol (152 g.) dissolved in ethanol (150 ml.) was mixed with p-toluenesulfonic acid monohydrate (128 g.) in ethanol (400 ml.), there separated a white crystalline precipitate of 2-chloro-4-(2-diethylaminoethylamino)-3,5 - dimethylbenzyl alcohol di-(p-toluenesulfonate). When the latter was dissolved in boiling absolute methanol, the hot solution treated with decolorizing charcoal and filtered, and the filtrate allowed to cool, there separated 3-chloro-N-(2-diethylaminoethyl)-4 - methoxymethyl - 2,6 - dimethylaniline di-(p-toluenesulfonate) (119 g.), M.P. 153.0–155.8° C. (corr.) with decomposition.

Analysis.—Calcd. for $C_{16}H_{27}ClN_2O \cdot 2C_7H_8O_3S$ (percent): S, 9.97; Cl, 5.56. Found (percent): S, 10.21; Cl, 5.61.

3-chloro-N-(2-diethylaminoethyl) - 4 - methoxymethyl-2,6-dimethylaniline in free base form was obtained by dissolving its di-(p-toluenesulfonate) in water, making the aqueous solution alkaline with aqueous sodium hydroxide solution, extracting the free base form with methylene dichloride, removing the methylene dichloride, and drying in vacuo at 65° C.

Following the foregoing procedure using, in place of boiling methanol, boiling n-propanol, n-butanol or n-hexanol to dissolve the 2-chloro-4-(2-diethylaminoethylamino)-3,5-dimethylbenzyl alcohol di - (p - toluenesulfonate), there is obtained the following ethers first in the form of their di-(p-toluenesulfonates) and then in their free base forms: 3-chloro-N-(2-diethylaminoethyl)-2,6 - dimethyl-4-n-propoxymethylaniline, 4-n-butoxymethyl-3-chloro-N-(2-diethylaminoethyl)-2,6 - dimethylaniline or 3-chloro-N - (2 - diethylaminoethyl) 4 - n - hexoxymethyl-2,6-dimethylaniline, respectively. Similarly, following the above procedure using, in place 2-chloro-4-(2-diethylaminoethylamino)-3,5-dimethylbenzyl alcohol, 2-chloro-4-(2-diethylaminoethyl)benzyl alcohol, 2 - chloro-4-(1-piperazinyl)benzyl alcohol or 2-chloro-4-(4-methyl-1-piperazinyl)benzyl alcohol, there is obtained first the respective benzyl alcohols as their di-(p-toluenesulfonates) and then, after treatment of the latter with boiling methanol, the following methyl ethers, first in the form of their di-(p-toluenesulfonates) and then in their free base forms: 3 - chloro-N-(2-diethylaminoethyl)-4-methoxymethylaniline, 3 - chloro - 4 - methoxymethyl-N-(1-piperazinyl)benzene or 3 - chloro - 4 - methoxymethyl-N-(4-methyl-1-piperazinyl)benzene, respectively.

EXAMPLE 20

3 - chloro - 4 - ethoxymethyl-N-(2-diethylaminoethyl)-2,6 - dimethylaniline was obtained following the procedure described in Example 19 using boiling ethanol instead of boiling methanol. Thus, from 1 g. of 2-chloro-4-(2-diethylaminoethylamino) - 3,5-dimethylbenzyl alcohol and 1.2 g. p-toluenesulfonic acid monohydrate, there was obtained 1.5 g. of 3-chloro-4-ethoxymethyl-N-(2-diethylaminoethyl)-2,6-dimethylaniline di - (p - toluenesulfonate), M.P. 140–142° C.

*Analysis.*—Calcd. for $C_{17}H_{29}ClN_2O \cdot 2C_7H_8O_3S$ (percent): Cl, 5.39; N, 4.26. Found (percent): Cl, 5.49; N, 4.10.

EXAMPLE 21

Fermentative enzymatic oxidation of 2-chloro-3,5-dimethyl-4-(1-piperazinyl)toluene (6 g.) to 2-chloro-3,5-dimethyl-4-(1-piperazinyl)benzyl alcohol (0.825 g.) was carried out following the procedure described in Example 2 using a reaction period of seven days, a conversion temperature of 28–29° C., an agitation rate of 400 r.p.m., an aeration rate of 4 liters per minute, and 120 ml. of 10 N sodium hydroxide solution to terminate the fermentation. The product was isolated as follows: The oily residue after evaporation of the methylene dichloride extracts was taken up in 300 ml. of methanol and the resulting solution extracted with two 100 ml. portions of n-hexane. Concentration of the methanol solution yielded 9 g. of viscous oil which was dissolved in 25 ml. of methylene dichloride and applied to 20 x 40 cm. thick layer (1 mm.) silica gel plates, twenty plates being used. The plates were developed in chloroform (87):methanol (10):isopropylamine (3) (parts by volume). The bands corresponding to the more polar conversion product were removed from each plate and eluted with 300 ml. of methanol. The methanol solution was first filtered through fine filter paper (Whatman No. 1), concentrated in vacuo to about 25 ml. and filtered through an ultra-fine sintered glass disc. The remaining methanol was removed in vacuo to yield 1.5 g. of oily material which was crystallized from ethyl acetate to yield 0.825 g. of 2-chloro-3,5-dimethyl-4 - (1 - piperazinyl)benzyl alcohol, M.P. 144–145° C.

*Analysis.*—Calcd. for $C_{13}H_{19}ClN_2O$ (percent): Cl, 13.92; N, 10.99. Found (percent): Cl, 14.05; N, 10.76.

EXAMPLE 22

Fermentative enzymatic oxidation of 2-chloro-4-(diethylaminoacetylamino)-3,5-dimethyltoluene (14 g.) to 2-chloro-4 - (diethylaminoacetylamino) - 3,5 - dimethylbenzyl alcohol was carried out following the procedure described in Example 2 using a reaction period of two weeks, a conversion temperature of 28–29° C., an agitation rate of 400 r.p.m., an aeration rate of 4 liters per minute, and 100 ml. of 10 N sodium hydroxide solution to terminate the fermentation. The residue after evaporation of the methylene dichloride was dissolved in 150 ml. of a mixture of 9 parts (by volume) of methanol and 1 part of water and the solution extracted with n-hexane. The methanol-water phase was evaporated in vacuo and dried to a thick oily residue which was dissolved in ether. The ether solution was treated with decolorizing charcoal, filtered and the filtrate cooled. The crystalline precipitate that separated was collected and purified by recrystallization from ethyl acetate-ether to yield 3.7 g. of 2-chloro-4-(diethylaminoacetylamino)-3,5 - dimethylbenzyl alcohol, M.P. 139–140° C.

*Analysis.*—Calcd. for $C_{13}H_{19}ClN_2O$ (percent): Cl, 11.87; N, 9.38. Found (percent): Cl, 11.71; N, 9.37.

Following the reductive procedure of Example 6A 2-chloro-4-(diethylaminoacetylamino) - 3,5-dimethylbenzyl alcohol is reduced to yield 2-chloro-4-(diethylaminoethylamino)-3,5-dimethylbenzyl alcohol.

When tested for local anesthetic activity by the standard intradermal injection method in guinea pigs, 2-chloro-4-(diethylaminoacetylamino) - 3,5 - dimethylbenzyl alcohol was found to produce average durations of anesthesia of 11 and 14 minutes at dose concentrations of 0.4 and 0.8%, respectively.

Following the procedure described above in Example 22 using the appropriate 4-(aminoacetylamino)-2-halotoluene in place of 2-chloro-4-(diethylaminoacetylamino)-3,5-dimethyltoluene, there is obtained the following corresponding 4-(aminoacetylamino)-2-halobenzyl alcohols:

2-chloro-4-(diethylaminoacetylamino)benzyl alcohol,
2-bromo-4-(diethylaminoacetylamino)benzyl alcohol,
2-chloro-4-(ethylaminoacetylamino)benzyl alcohol,
2-chloro-4-(1-piperidinylacetylamino)benzyl alcohol, or
2-chloro-4-(dimethylacetylamino)benzyl alcohol.

Reduction of these compounds as in Example 22 yield respectively:

2-chloro-4-(2-diethylaminoethylamino) benzyl alcohol,
2-bromo-4-(2-diethylaminoethylamino)benzyl alcohol,
2-chloro-4-(2-ethylaminoethylamino)benzyl alcohol,
2-chloro-4-[2-(1-piperidinyl)ethylamino]benzyl alcohol
or
2-chloro-4-(2-dimethylaminoethylamino)benzyl alcohol.

The foregoing intermediate 4-(aminoacetylamino)-2-halotoluenes are prepared from the corresponding known 4-amino-2-halotoluenes by reacting the latter with chloroacetyl chloride to form the corresponding 4-(chloroacetylamino)-2-halotoluenes which are then reacted with the appropriate amine, e.g., diethylamine, to form the corresponding 4-(aminoacetylamino) compounds, e.g., 4-(diethylaminoacetylamino)-2-halotoluenes using diethylamine. The preparation of these intermediates is illustrated as follows for the preparaton of 2-chloro-N-(diethylaminoacetyl) - 3,5 - dimethyltoluene form 3-chloro-2,4,6-trimethylaniline: To a stirred refluxing solution of 8 g. of 3-chloro-2,4,6-trimethylaniline in 25 ml. of ethylene dichloride was added dropwise a solution of 5.46 g. of chloroacetyl chloride in 15 ml. of ethylene dichloride. The resulting reaction mixture was refluxed with stirring for three hours, cooled, diluted with 100 ml. of n-pentane, and stirred cold for 30 minutes. The resulting precipitate was collected, washed with n-pentane, recrystallized from absolute ethanol-n-pentane and dried in vacuo at 60 C. to yield 7.8 g. of 2-chloro-4-(chloroacetylamino)-3,5-dimethyltoluene, M.P. 167–168° C. A mixture of said 4-(chloroacetylamino) compound with 6.94 g. of diethylamine and 75 ml. of benzene was refluxed for four hours, concentrated to about one-half the original volume, washed with water and extracted with dilute aqueous hydrochloric acid. The acidic extract was washed with ether, made basic with concentrated ammonium hydroxide and extracted with ether. The ether extract was dried over anhydrous sodium sulfate, and heated in vacuo to remove the ether, thereby leaving 8.7 g. of 2-chloro-4-(diethylaminoacetylamino)-3,5-dimethyltoluene. A solution of this compound in isopropyl alcohol was treated with 2.59 ml. of concentrated hydrochloric acid in isopropyl alcohol, the reaction mixture warmed and then allowed to cool, whereupon the white hydrochloride separated. The mixture was diluted with absolute ether and the precipitate was collected, recrystallized from absolute ethanol-ether, dried in vacuo at 60° C. to yield 6.0 g. of 2 - chloro-4-(diethylaminoacetylamino)-3,5-dimethyltoluene as its hydrochloride, M.P. 150.0–154.0 C. (corr.).

*Analysis.*—Calcd. for $C_{15}H_{23}ClN_2O \cdot HCl$ (percent): Cl, 22.1; N, 8.77. Found (percent): Cl, 22.39; N, 8.80.

The following intermediate 4-(amino-acetylamino)-2-halotoluenes are similarly prepared in two steps using the appropriate 4-amino-2-halotoluene, chloroacetyl chloride and tertiary- or secondary-amine; 2-chloro-4-(di-ethyl-aminoacetylamino)toluene, 2 - bromo - 4-(diethylamino-acetylamino)toluene, 2 - chloro - 4 - (ethylaminoacetylamino)toluene, 2 - chloro - 4 - (1-piperidinylacetylamino) toluene and 2 - chloro - 4-(dimethylaminoacetylamino) toluene.

EXAMPLE 23

2 - chloro-4-(2-diethylaminoethylamino)-3,5-dimethylbenzyl alcohol as its cyclohexanesulfamate was prepared by adding a solution of 4.45 g. of N-cyclohexyl-sulfamic acid in 45 ml. of acetone to a solution of 7.1 g. of said benzyl alcohol in 50 ml. of acetone whereupon the salt crystallized immediately, cooling the mixture to 5° C., collecting the precipitate, washing it with a little acetone and ether, and drying it in vacuo at 70° C. to yield 10.5 g. of said cyclohexanesulfamate, M.P. 135° C.

*Analysis.*—Calcd. for $C_{15}H_{25}ClN_2O \cdot C_6H_{13}NO_3S$ (percent): Cl, 7.65; N, 9.06. Found (percent): Cl, 7.75; N, 8.91.

Following the procedure described in Example 1 using the appropriate 4 - [amino - (polycarbon - lower-alkyl) - amino] - 2 - halotoluene, the corresponding 4-[amino-(polycarbon-lower-alkyl)-amino] - 2 - halobenzyl alcohols are obtained, as illustrated, without limiting the foregoing by the compounds of Tables B and C.

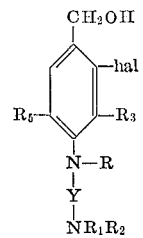

TABLE B

| Number | hal | R | Y—NR₁R₂ | R₃ | R₅ |
|---|---|---|---|---|---|
| 1 | Br | H | $(CH_2)_2N(C_2H_5)_2$ | H | H |
| 2 | I | H | $(CH_2)_2NHC_3H_7$-n | $C_2H_5$ | $C_2H_5$ |
| 3 | F | H | $(CH_2)_3N(CH_3)_2$ | $CH_3$ | H |
| 4 | Cl | $CH_3$ | $(CH_2)_2N(C_2H_5)_2$ | H | $CH_3$ |
| 5 | Cl | H | $CH(CH_3)CH_2N(CH_3)_2$ | H | H |
| 6 | Cl | H | $(CH_2)_6N(C_2H_5)_2$ | H | H |
| 7 | Cl | H | $(CH_2)_2NHCH_2CH_2OH$ | H | H |
| 8 | Cl | H | $(CH_2)_2N(CH_2CH_2OH)_2$ | H | H |
| 9 | Cl | H | $(CH_2)_2NH_2$ | H | H |
| 10 | Cl | H | $(CH_2)_2NHCH_2CH=CH_2$ | H | H |
| 11 | Cl | H | $(CH_2)_2N(C_6H_{13}$-n$)_2$ | H | H |
| 12 | Cl | H | $CH_2CH_2N(CH_2CH_2OH)(C_2H_5)$ | H | H |
| 13 | Cl | H | $CH_2CH_2NC_5H_{10}$[a] | H | H |
| 14 | Cl | H | $(CH_2)_3NC_4H_8$[b] | H | H |
| 15 | Cl | H | $(CH_2)_2NC_4H_8O$ [c] | H | H |
| 16 | Cl | H | $(CH_2)_2NC_6H_{12}$[d] | H | H |
| 17 | Cl | H | $(CH_2)_2NC_6H_{12}$[e] | H | H |
| 18 | Cl | H | $(CH_2)_2NC_7H_{14}$[f] | H | H |
| 19 | Cl | H | $(CH_2)_2N(C_2H_5)(CH_2C(CH_3)_2OH)$ | H | H |
| 20 | Cl | H | $(CH_2)_2NC_4H_8NCH_3$[g] | H | H |
| 21 | Cl | H | $(CH_2)_2NH(CH_2)_5OH$ | H | H |
| 21 | Cl | H | $(CH_2)_2NH(CH_2)_6OH$ | H | H |
| 22 | Cl | H | $(CH_2)_2NHCH_2CH(CH_3)=CH_2$ | H | H |

[a] $NC_5H_{10}$=piperidino.
[b] $NC_4H_8$=pyrrolidino.
[c] $NC_4H_8O$=morpholino.
[d] $NC_6H_{12}$=hexamethyleneimino.
[e] $NC_6H_{12}$=2,5-dimethylpyrrolidino.
[f] $NC_7H_{14}$=2,6-dimethylpiperidino.
[g] $NC_4H_8NCH_3$=4-methylpiperazino.

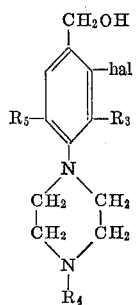

TABLE C

| Number | hal | R₄ | R₃ | R₅ |
|---|---|---|---|---|
| 1 | Cl | H | CH₃ | CH₃ |
| 2 | Br | H | H | H |
| 3 | I | H | H | H |
| 4 | F | H | H | H |
| 5 | Cl | CH₂C(CH₃)=CH₂ | H | H |
| 6 | Cl | CONH₂ | H | H |
| 7 | Cl | COOC₂H₅ | CH₃ | H |
| 8 | Cl | CH₂CH₂OH | C₂H₅ | C₂H₅ |
| 9 | Cl | (CH₂)₄OH | H | H |
| 10 | Cl | COCH₃ | H | H |
| 11 | Cl | COC₃H₇-n | H | H |
| 12 | Cl | CO(CH₂)₂COOH | H | H |
| 13 | Cl | (CH₂)₃O—⟨C₆H₄⟩—C(CH₃)₂—CH₂—C(CH₃)₂—CH₃ | H | H |
| 14 | Br | (CH₂)₆O—⟨C₆H₄⟩—C(CH₃)₂CH₂CH₃ | H | H |
| 15 | Cl | (CH₂)₅O—⟨C₆H₃(Cl)⟩—CH₂CH=CH₂ | H | H |
| 16 | Cl | COOC₃H₇-n | H | H |
| 17 | Cl | COCH₂CH₃ | H | H |
| 18 | Cl | C₆H₁₃-n | H | H |
| 19 | Cl | CH₂CH₂C₆H₅ | H | H |
| 20 | Cl | (CH₂)₃O—⟨C₆H₄⟩—OC₄H₉-n | H | H |

The 4-[amino-(polycarbon-lower-alkyl)-amino]-2-halobenzyl alcohols of Tables B and C also can be prepared by following the procedure described in Examples 4A or 5A using a corresponding molar equivalent quantity of the appropriate ethyl or other lower-alkyl 4-[amino-(polycarbon-lower-alkyl)amino]-2-halobenzoate or by following the procedure described in Examples 7A, 8A, 9A, 11D or 12A using a corresponding molar equivalent quantity of the appropriate 4-[amino-(polycarbon-lower-alkyl)-amino]-2-halobenzaldehyde; the latter benzaldehydes can be obtained by following the procedure described in Examples 10A, 11A or 12B using corresponding molar equivalent quantities of the appropriate 3-(1-piperazinyl)-halobenzene, dimethylformamide and phosphorus oxychloride or by following the procedure described in Examples 7B, 8B, or 9B using the appropriate intermediates prepared as illustrated in Examples 7C, 8C or 9C. The 4-aminoethylamino-2-halobenzyl alcohols of Table B, i.e. Compound Numbers 1, 2, 4, 7–13 and 15–22, also can be prepared by following the procedure described in Example 6A by reducing the corresponding ethyl 4-aminoacetylamino-2-halobenzoate, which in turn can be prepared by following the procedure of Example 6B using ethyl 2-chloro-4-(chloroacetamido)benzoate and appropriate amine or ammonia (for No. 9).

The 4-[amino-(polycarbon-lower-alkyl)-amino]-2-halobenzyl alcohols and lower-alkyl ethers of our invention when administered orally to hamsters and Swiss mice infected with *Schistosoma mansoni* were found to clear completely the animals of the parasitic infection at varying dose levels of compound per kg. of body weight per day for five consecutive days. Some of the most active embodiments have $ED_{50}$ values below 20 mg. per kg. of body weight, $ED_{50}$ meaning the effective dose necessary to clear 50% of the hamsters or mice (at least 5 animals at each of three or more dose levels) of the schistosomal infection. Generally, our 4-[amino-(polycarbon-lower-alkyl)amino] - 2 - halobenzyl alcohols and ethers have greater activity in hamsters and have greater or approximately the same activity in mice when compared with the corresponding heretofore known 4-[amino-(polycarbon-lower-alkyl) - amino]-2-halotoluenes. Also, our benzyl alcohols were generally less toxic than the corresponding known toluene derivatives when determined by standard procedures in Swiss mice. Illustrative of the schistosomacidal activity of our compounds when determined as described above are the following data: 2 - chloro - 4-(2-diethylaminoethylamino)benzyl alcohol, oral $ED_{50}$ values of 9.0±2.4 mg./kg./day and 15.0±2.8 mg./kg./day in hamsters and Swiss mice, respectively, compared with respective values of 45±16.6 mg./kg./day and 13.0±2.7 mg./kg./day for the corresponding toluene derivative, i.e., 2-chloro-4-(2-diethylaminoethylamino)toluene (HCl salt); 2 - chloro-4-(1-piperazinyl) benzyl alcohol, oral $ED_{50}$ values of about 12.5 mg./kg./day and 2.1±0.5 mg./kg./day in hamsters and Swiss mice, respectively, compared with respective values of 84±29.3 mg./kg./day and 7.5±2.0 mg./kg./day for the corresponding toluene compound (di-HCl salt); 2-chloro-4-(4-ethyl-1-piperazinyl)benzyl alcohol, oral $ED_{50}$ values of 17.5±8.1 mg./kg./day and 4.1±1.8 mg./kg./day in hamsters and Swiss mice respectively; 2-chloro-4-[4-(3-carboxy-2-propenoyl)-1-piperazinyl]benzyl alcohol, oral $ED_{50}$ of 6.0±1.3 mg./kg./day in mice; 2-chloro-4-(2-diethylaminoethylamino)-3,5-dimethylbenzyl alcohol di-(p-toluenesulfonate), oral $ED_{50}$ of 3.7±2.0 mg./kg./day in Swiss mice; 3-chloro-N-(2-diethylaminoethyl)-4-methoxymethyl-2,6-dimethylaniline di-(p-toluenesulfonate), oral $ED_{50}$ of 3.4±0.5 mg./kg./day in Swiss mice; 3-chloro-4-ethoxymethyl-N-(2-diethylaminoethyl)-2,6-dimethylaniline di-(p-toluenesulfonate), oral $ED_{50}$ of about 12.5 mg./kg./day in hamsters. Illustrative of the toxicity of our compounds are the following acute intravenous $LD_{50}$ values in Swiss mice, $LD_{50}$ meaning the dose lethal to 50% of the mice (10 mice tested at each of three dose levels): 2-chloro-4-(2-diethylaminoethylamino)benzyl alcohol, $LD_{50}$ of 51±2 mg./kg., compared with 33±2.2 mg./kg. for the corresponding 2-chloro-4-(2-diethylaminoethylamino)toluene; 2-chloro-4-(1-piperazinyl)benzyl alcohol, $LD_{50}$ of 52±4 mg./kg., compared with 39±2.6 mg./kg. for the corresponding toluene compound.

The subject matter which the applicants regard as their invention is particularly pointed out and distinctly claimed as follows:

1. 2-halo-3-$R_3$-4-(4-$R_4$-1-piperazinyl)-5-$R_5$-benzaldehyde where $R_3$ and $R_5$ are each hydrogen or primary- or secondary-lower-alkyl, and $R_4$ is hydrogen, lower-alkyl, lower-alkanoyl, lower-carbalkoxy, carboxy-(lower-alkanoyl) or carboxy-(lower-alkenoyl).

2. 2-chloro-4-(1-piperazinyl)benzaldehyde according to claim 1 where halo is chloro and $R_3$, $R_4$ and $R_5$ are each hydrogen.

References Cited
UNITED STATES PATENTS

| | | | |
|---|---|---|---|
| 1,807,693 | 6/1931 | Kauscher | 260—599 |
| 2,830,056 | 4/1958 | Ruschig | 260—268 |
| 2,945,860 | 7/1960 | Schmidt-Barbo | 260—268 |
| 3,129,257 | 4/1964 | Paquette | 260—599X |
| 3,270,004 | 8/1966 | Alter | 260—268X |
| 3,379,620 | 4/1968 | Archer et al. | 195—51 |
| 3,107,261 | 10/1963 | Gerber et al. | 260—453 |

FOREIGN PATENTS

| | | | |
|---|---|---|---|
| 607,920 | 9/1948 | Great Britain | 260—286 |

OTHER REFERENCES

Burger: Medicinal Chemistry, 2nd edition, Interscience, 1960, p. 42 relied on.

DONALD G. DAUS, Primary Examiner

U.S. Cl. X.R.

195—51; 260—239, 277.7, 294.7, 326.87, 471, 544, 562, 571, 577, 690; 424—248, 250, 263, 320

PO-1050
(5/69)

UNITED STATES PATENT OFFICE
CERTIFICATE OF CORRECTION

Patent No. 3,558,629                     Dated  January 26, 1971

Inventor(s) Sydney Archer & David Rosi

It is certified that error appears in the above-identified patent and that said Letters Patent are hereby corrected as shown below:

Column 1, line 34, between the comma and "Apr." insert --issued--. Column 2, line 5, "4[-" should read -- 4-[ --. Column 3, line 40, "-$CHC_2HCH_3$" should read -- -$CH_2CHCH_3$ --; line 43, after "-$(CH_2)_6$-" insert -- ; --; line 48, "hydroxyl should read --hydroxyalkyl"--. Column 4, line 15, "dose" should read --doses--; line 30, "3,3'dicarboxylic" should read --3,3 dicarboxylic--; line 38, "orgnic" should read --organic--. Column 5, line 21, between "shaker" and "Note" insert a peric line 40, "interemdiate" should read --intermediate--. Column line 13, "alkyl-amino" should read --alkyl)-amino--; line 59, "aminoacetylamines" should read --aminoethylamines--. Column line 61, "Actinomycetals" should read --Moniliales--. Column line 4, "blankesleea-" should read --blakesleea- --. Column line 6, "pieprazinyl" should read --piperazinyl--; line 62, "unsubstittued" should read --unsubstituted--; line 64, "-ber should read -- -benzoate --; line 67, "aminoethylamio" should --aminoethylamino--. Column 13, line 63, "og" should read -- Column 20, line 2, "declor-" should read -- decolor- --; line "an" should read --and--. Column 21, line 10, ") 4" should r -- )-4 --. Column 22, line 17, "$H_{19}$" should read --$H_{23}$--; an "O" should read --$O_2$--; line 58, "preparaton" should read --preparation--. Column 24, Table B, third line from the bot "$NC_1H_{12}$" should read --$NC_6H_{12}$--.

Signed and sealed this 17th day of August 1971.

(SEAL)
Attest:

EDWARD M. FLETCHER, JR.                     WILLIAM E. SCHUYLER, JR.
Attesting Officer                           Commissioner of Patents